(12) United States Patent
Stevens et al.

(10) Patent No.: US 11,232,643 B1
(45) Date of Patent: Jan. 25, 2022

(54) COLLAPSING OF 3D OBJECTS TO 2D IMAGES IN AN ARTIFICIAL REALITY ENVIRONMENT

(71) Applicant: Facebook Technologies, LLC, Menlo Park, CA (US)

(72) Inventors: Jasper Stevens, London (GB); Etienne Pinchon, London (GB); Jonathan Ravasz, London (GB); Evgenii Krivoruchko, Cologne (DE); Wai Leong Chak, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/131,592

(22) Filed: Dec. 22, 2020

(51) Int. Cl.
*G06T 19/00* (2011.01)
*G06T 7/73* (2017.01)
*G06F 3/01* (2006.01)

(52) U.S. Cl.
CPC ............ *G06T 19/006* (2013.01); *G06F 3/013* (2013.01); *G06T 7/75* (2017.01); *G06T 2219/004* (2013.01); *G06T 2219/024* (2013.01)

(58) Field of Classification Search
CPC combination set(s) only.
See application file for complete search history.

(56) References Cited

U.S. PATENT DOCUMENTS

| | | | |
|---|---|---|---|
| 9,514,573 B2* | 12/2016 | Grimaud | G06T 17/00 |
| 11,024,101 B1* | 6/2021 | Chepizhenko | G06T 11/00 |
| 2015/0269785 A1* | 9/2015 | Bell | G06T 15/20 |
| | | | 345/427 |
| 2019/0347865 A1* | 11/2019 | Hackett | G06T 19/20 |
| 2020/0167995 A1* | 5/2020 | Hare | G06K 9/00208 |
| 2020/0250879 A1* | 8/2020 | Foster | G05D 1/0276 |
| 2020/0302699 A1* | 9/2020 | Cantor | G06T 11/001 |
| 2020/0372715 A1* | 11/2020 | Sawhney | G06T 15/506 |
| 2020/0410763 A1* | 12/2020 | Hare | G06T 15/04 |

* cited by examiner

Primary Examiner — Motilewa Good Johnson
(74) Attorney, Agent, or Firm — Potomac Law Group, PLLC

(57) ABSTRACT

The present embodiments relate to generating 3D objects in an artificial reality environment and collapsing 3D objects into 2D images representing the 3D objects. Users operating extra reality (XR) devices controlling the artificial reality environment can collaboratively create or modify content in the artificial reality environment, using real-world creation objects (such as a hand of the user or a pen held by the user) to create 3D objects. In response to a user triggering a collapse for a 3D object, a 2D image of the 3D object can created, from the user's perspective. The 2D image can replace the 3D object in the artificial reality environment. Presenting the 2D image can reduce the amount of data, processing resources, and power needed to provide the artificial reality environment while also reducing clutter and cognitive load on the user.

18 Claims, 20 Drawing Sheets

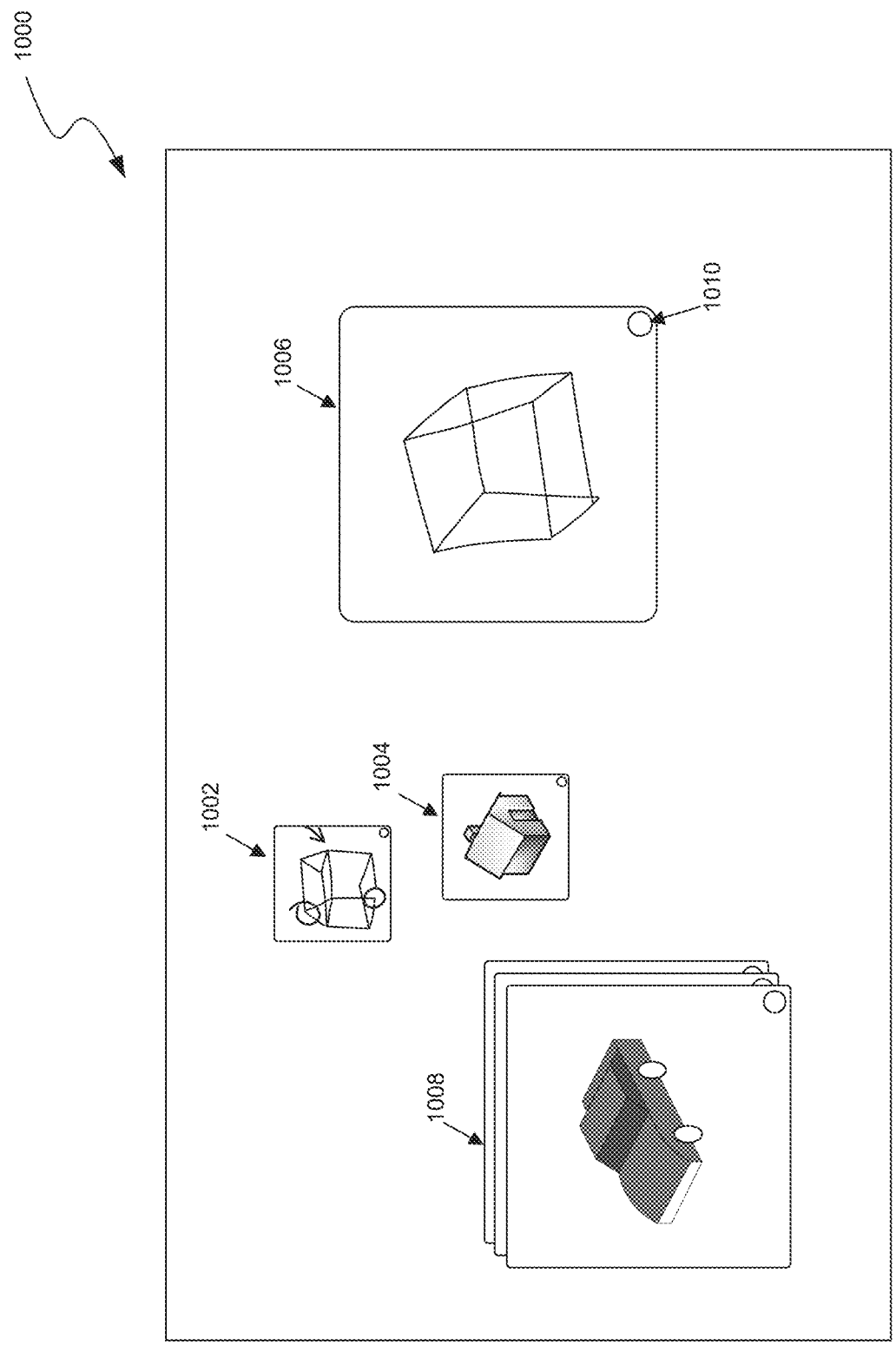

US 11,232,643 B1

COLLAPSING OF 3D OBJECTS TO 2D IMAGES IN AN ARTIFICIAL REALITY ENVIRONMENT

TECHNICAL FIELD

The present disclosure is directed to display of content in an artificial reality environment, and more particularly, to modifying three-dimensional (3D) objects in an artificial reality environment and generating two-dimensional (2D) representations of 3D objects in the artificial reality environment.

BACKGROUND

Users interacting with extra reality (XR) devices can view content in an artificial reality environment that includes real-world objects and/or virtual objects. An artificial reality environment can include a computer-generated space that depicts real-world objects and/or virtual objects. For example, the artificial reality environment can include a virtual environment depicted by a virtual reality (VR) device showing a set of virtual objects. As another example, the artificial reality environment can depict real-world objects and virtual objects supplemented over the real-world objects. A user can view the objects in the artificial reality environment and modify content in the artificial reality environment. For example, a user can add new content to a three-dimensional (3D) object or annotate content in the artificial reality environment.

Further, multiple users interacting with XR devices can view and modify content in the artificial reality environment. The multiple users can interact with 3D objects in the artificial reality environment from various perspectives and collaborate with one another in the artificial reality environment.

BRIEF DESCRIPTION OF THE DRAWINGS

FIG. 10 is an illustration of multiple 2D images, corresponding to 3D objects, disposed in an artificial reality environment.

The techniques introduced here may be better understood by referring to the following Detailed Description in conjunction with the accompanying drawings, in which like reference numerals indicate identical or functionally similar elements.

DETAILED DESCRIPTION

Figure 1:
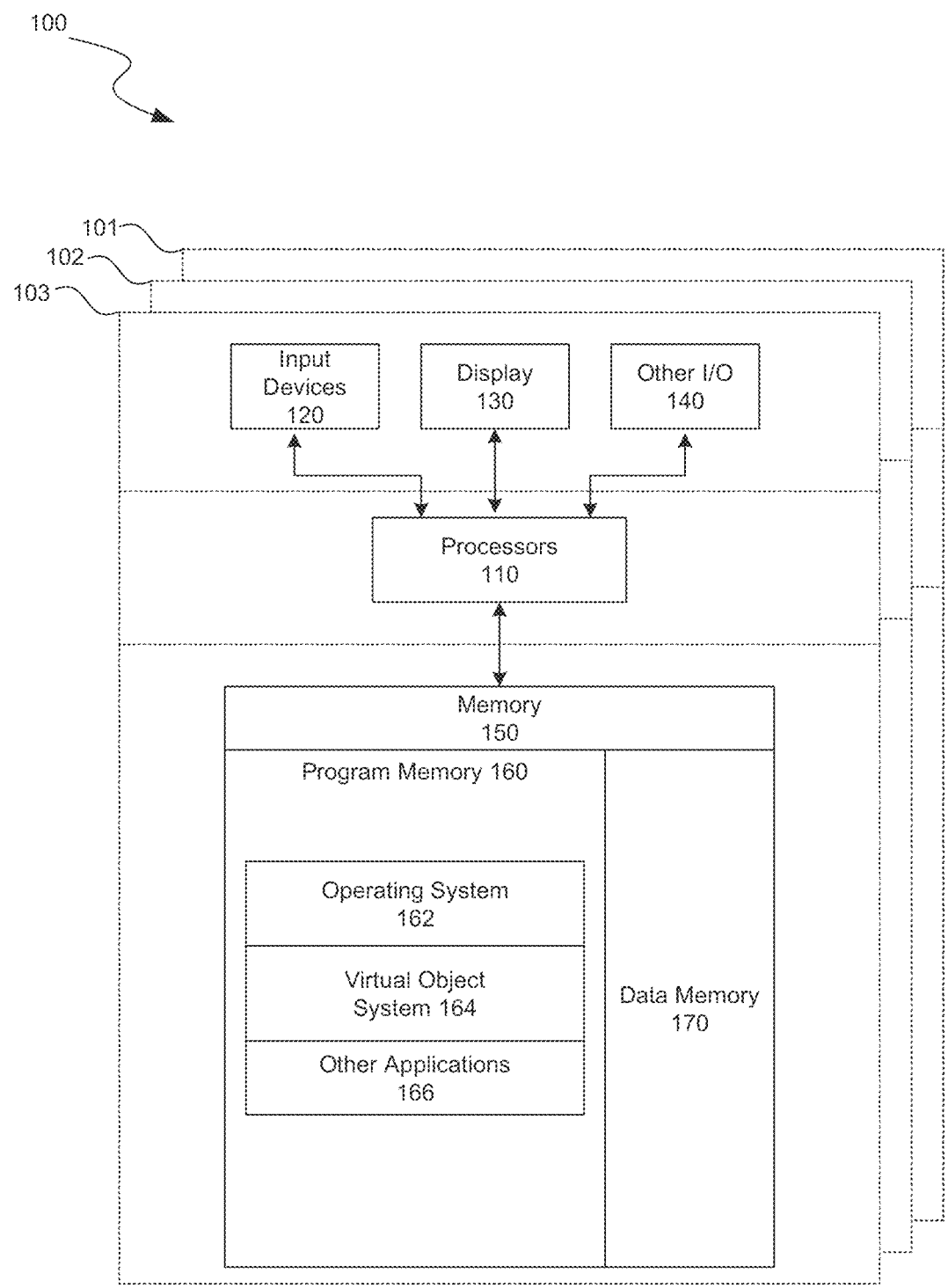
FIG. 1 is a block diagram illustrating an overview of devices on which some implementations of the present technology can operate.

Aspects of the present disclosure are directed to a virtual object system that can receive commands to generate and annotate 3D objects in an artificial reality environment, collapse 3D objects into 2D images representing 3D objects, and display and share virtual objects using their 2D representations. For example, one or more users can draw in a 3D space by moving creation objects tracked by extra reality (XR) devices. A "creation object" as described herein can include a real-world object controlled by a user that allows for creation of content in the artificial reality environment. For instance, the creation object can include a hand of a user, a controller, a pen, a stylus, etc. The creation object can identify a position of content to add in the artificial reality environment.

The drawings can be saved as a virtual 3D object. The user can collapse the created (or another) 3D object into a 2D image, such as by performing a specified gesture recognized by the XR device. The virtual object system can collapse the 3D object into a 2D image from the user's point of view and replace the 3D object with the collapsed version, which the virtual object system can link to the 3D object. The user can then display, share, or manipulate the 2D image. At another point in time, a user can activate another control in relation to the 2D image to replace it with the 3D version.

More particularly, the virtual object system can receive input from one or more users operating XR devices to create or modify content in an artificial reality environment. The input can be drawing in three dimensions, such as with a real-world creation object (e.g., the user's hand, a stylus, or other controller). In various implementations, this can be a collaborative process between co-located users or users in disparate locations operating in a shared artificial reality environment. Such drawings can be in an open space to create a new 3D object or can be an annotation made on, and attached to, an existing virtual object. The user can form the drawings with various drawing tools such as pens, preformed shapes, color selectors, erasers, etc. Additional details on receiving a drawing in an artificial reality environment are provided below in relation to FIGS. 5-7, 12 and 13.

When viewing a 3D object (either one the user has created or an existing one) a user can provide an instruction to the virtual object system to collapse a viewed object, such as with a gesture, spoken command, activating a virtual control, etc. In response to the instruction to collapse the 3D object, the virtual object system can create a 2D image of the 3D object from the user's point of view. For example, in various implementations, the virtual object system can determine a vector for the user's point of view and collapse the virtual object into a plane perpendicular to the vector or can put a virtual camera at the user's viewpoint and take an image of a layer including the 3D object from that viewpoint. The virtual object system can then replace the 3D object with the created 2D image. The 3D object can be saved without being displayed in the artificial reality environment, linking it to the 2D image.

Presenting the 2D image can reduce the amount of data in presenting information in the artificial reality environment. Particularly, if the environment includes multiple 3D objects, collapsing one or more 3D objects and presenting 2D images can reduce the amount of data/computational resources required to render the artificial reality environment. Further, multiple 2D images can be shared using a small amount of network resources, while allowing the 3D versions to be transferred in the background or upon user selection to expand a particular 2D image.

In response to a selection to expand the 2D image to recall the 3D object (e.g., though a gesture, voice command, control activation, etc.), the system can retrieve data for the 3D object and present the 3D object in the artificial reality environment in place of the 2D image. Additional details on collapsing 3D objects into 2D images are provided below in relation to FIGS. 8-11, 14, and 15.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

As noted above, an artificial reality environment can include one or more users viewing multiple (3D and/or 2D) objects. Rendering multiple 3D objects in the artificial reality environment can require large amount of data and computational resources, and sharing 3D objects can use significant network resources. Further, multiple 3D objects in an artificial reality environment can become cluttered and make it difficult for a user to operate in the artificial reality environment.

Collapsing 3D objects into 2D images and rendering the 2D images can significantly lower the amount of data and computational resources required to render the artificial reality environment. Further, the 2D images can be transferred between systems more efficiently than 3D objects. When such a transfer occurs, the recipient can begin using the 2D version while the linked 3D version is transferred in the background. In some implementations, only the 2D image is transferred until the virtual object system receives a command to replace it with the 3D object, at which point the virtual object system can retrieve the 3D object. Thus, responsive to a selection of a 2D image, the virtual object system can retrieve 3D object data and render the 3D object in the artificial reality environment. Remotely storing the 3D object data (e.g., at a server, another XR device) can increase computational processing and computing network efficiency.

The virtual object system also provides organizational and virtual space saving optimizations. Replacing 3D objects with 2D images allows the 2D images to be more easily organized and conceptualized. For example, the 2D images can be efficiently moved about the artificial reality environment, arranged on a flat surface, easily stacked or grouped, etc.

Several implementations are discussed below in more detail in reference to the figures. FIG. 1 is a block diagram illustrating an overview of devices on which some implementations of the disclosed technology can operate. The devices can comprise hardware components of a computing system 100 that can capture features in an artificial reality environment, render virtual objects, and collapse 3D objects into 2D images in the artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual object system 164, and other application programs 166. Memory 150 can also include data memory 170 that can include data relating to one or more 3D object and/or 2D images to be presented in the artificial reality environment, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
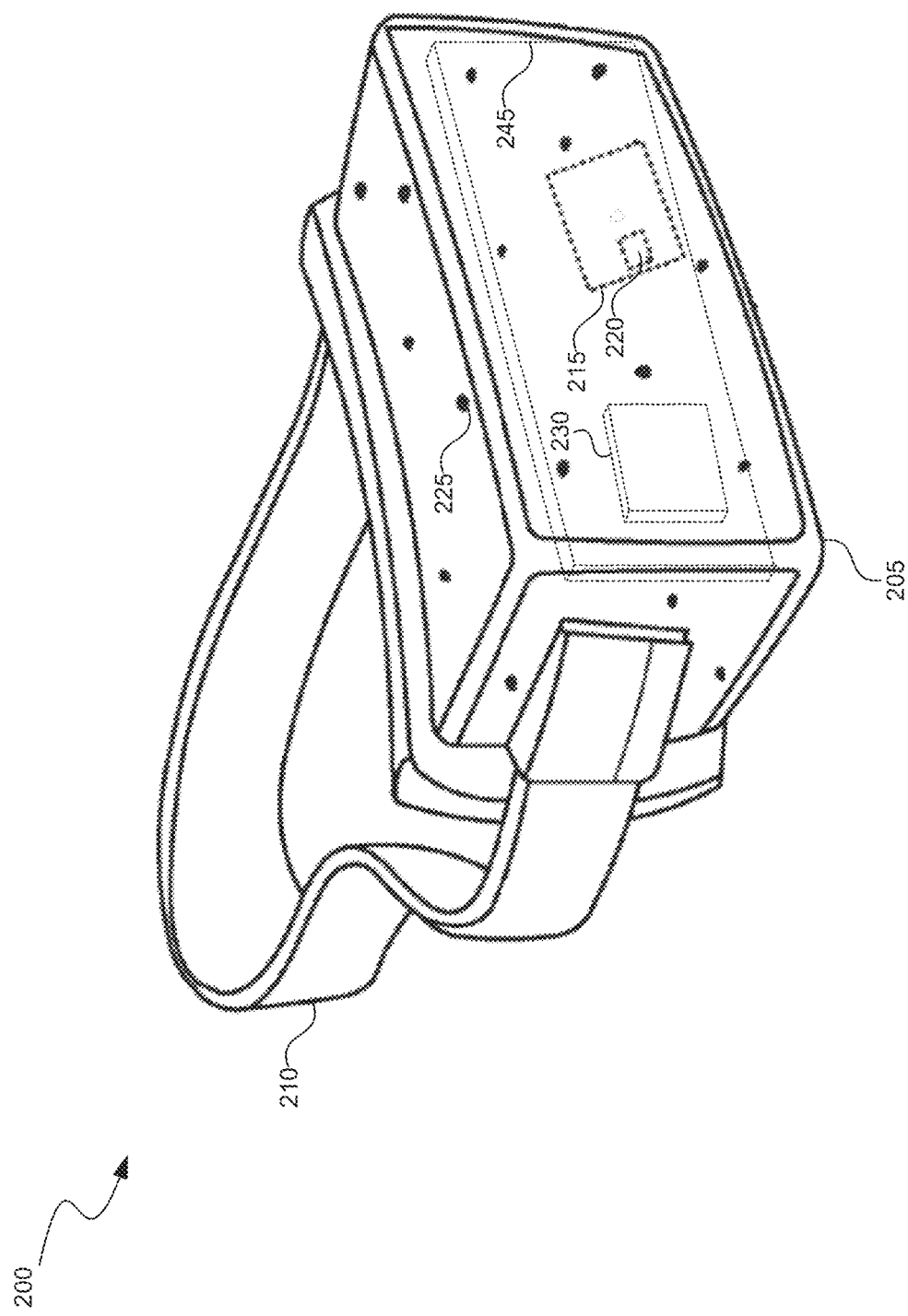
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
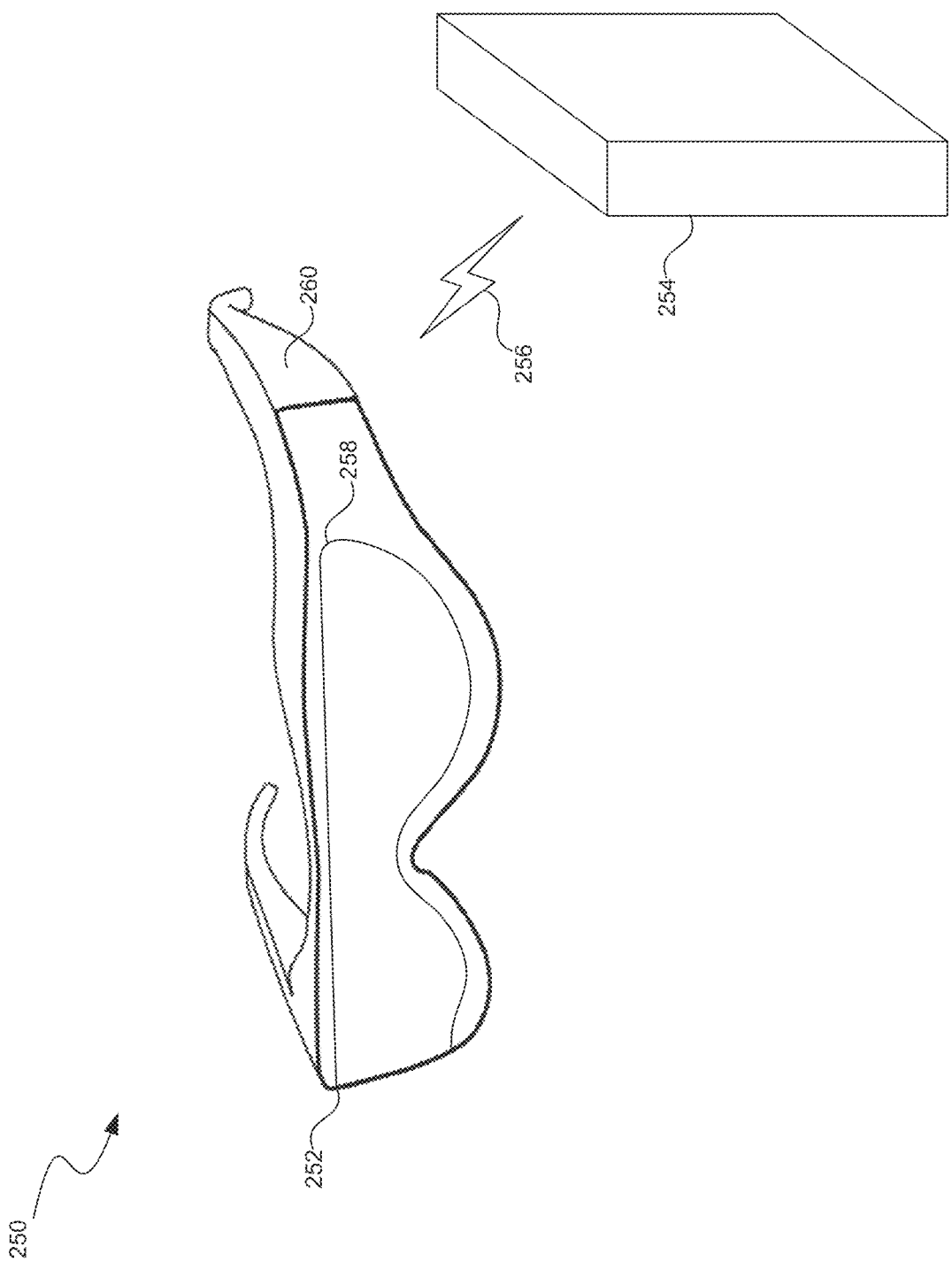
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
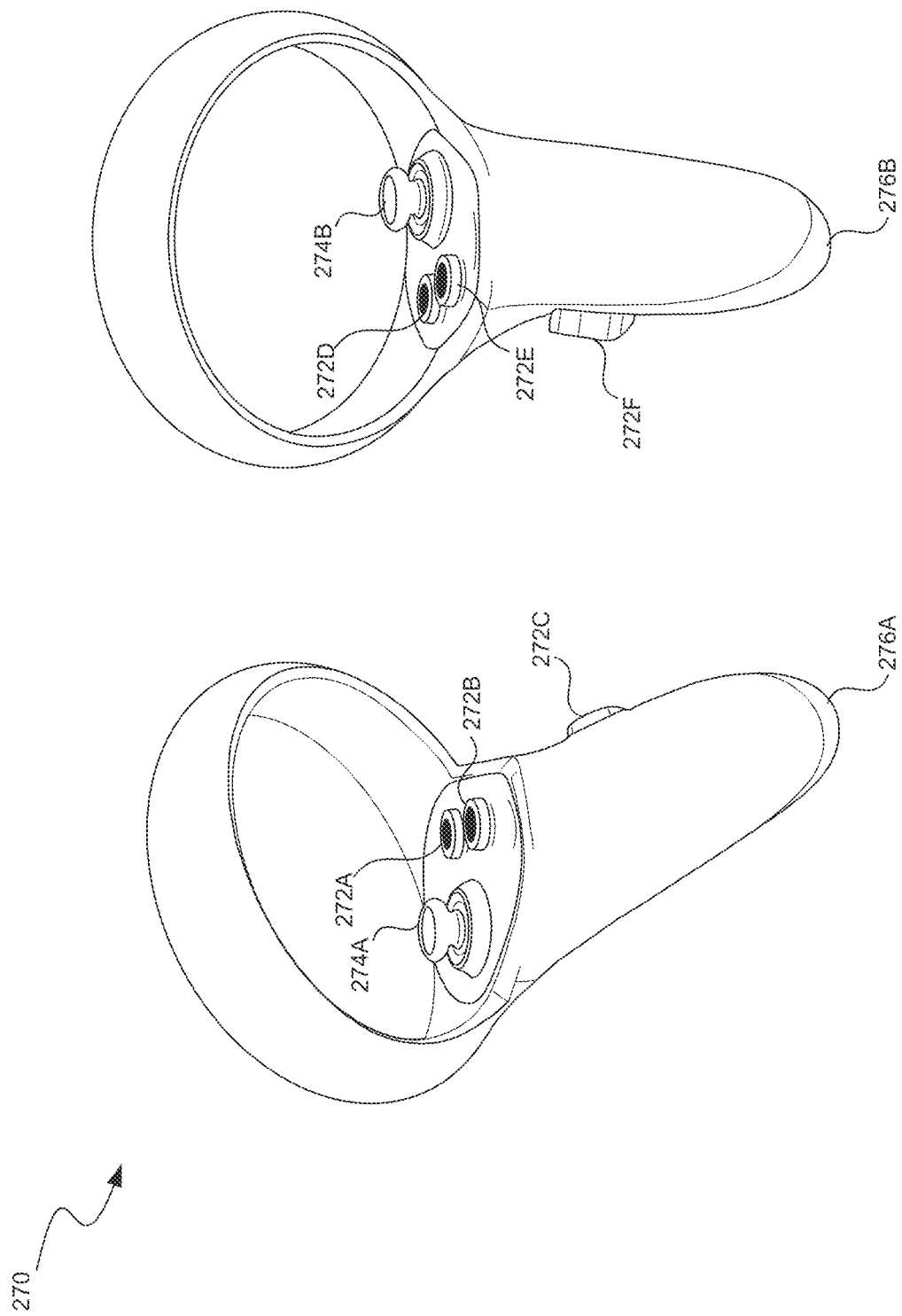
FIG. 2C illustrates controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
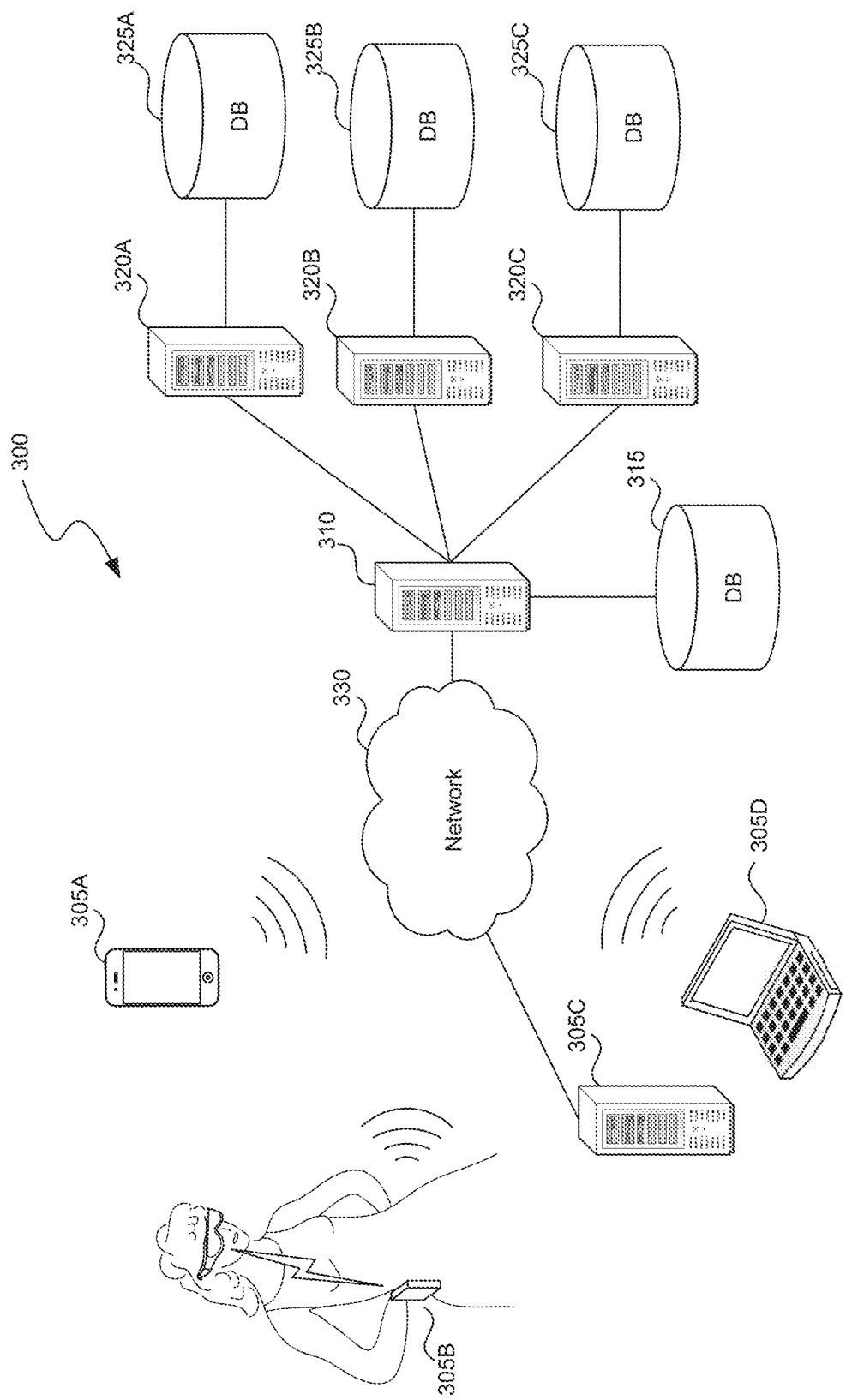
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
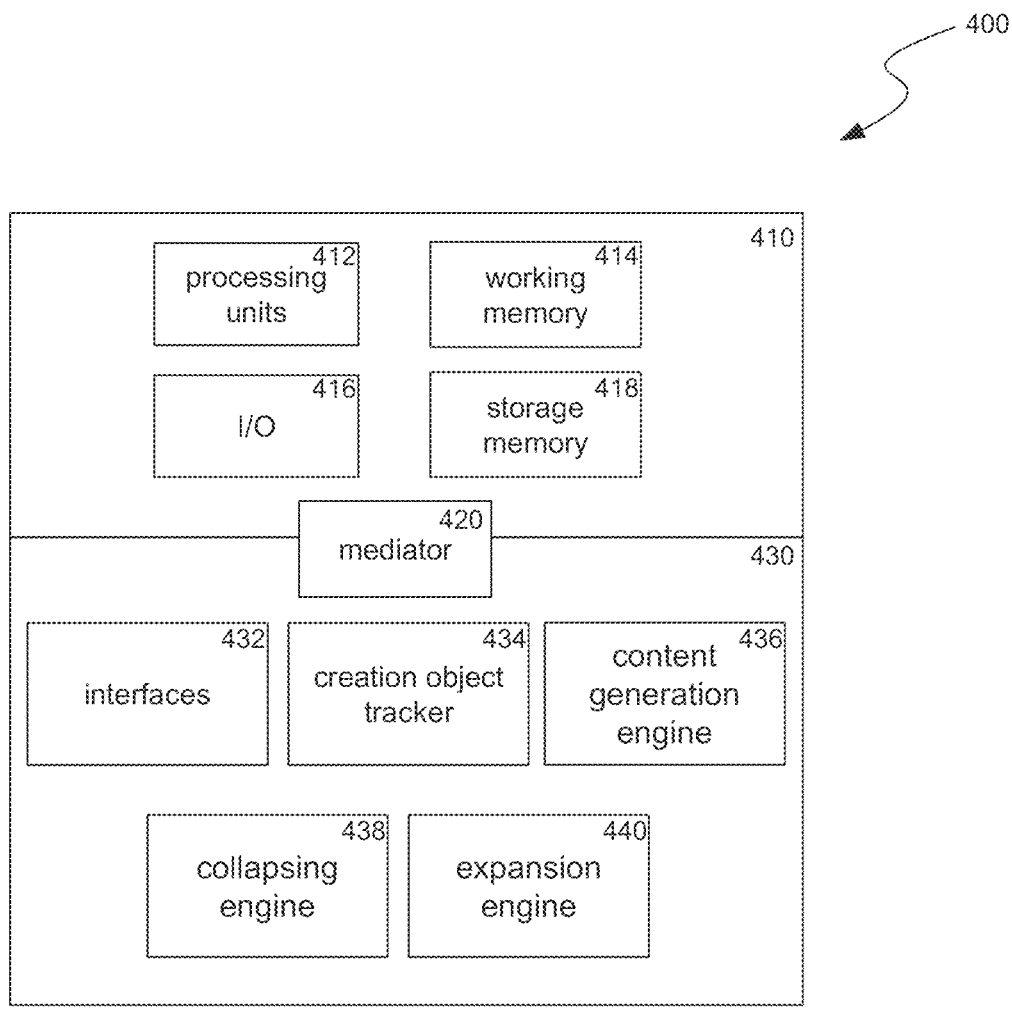
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for receiving 3D drawings, modifying 3D objects, and collapsing 3D objects into 2D images representing the 3D objects. Specialized components 430 can include a creation object tracker 434, a content generation engine 436, a collapsing engine 438, an expansion engine 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Creation object tracker 434 can track locations for a creation object, providing coordinates in an artificial reality environment. In various implementations, the creation object can be a user appendage, a hardware device, or a physical object that is not in communication with the XR device. In some implementations, the creation object tracker 434 can analyze images that capture the creation object or signals (e.g., light, radio signals, sonar) emitted by the creation object to identify its location. In some cases, the creation object can include its own sensors (e.g., IMU sensors, light capture units, etc.) to determine positions and can send this data to the XR device, e.g., over a wireless communication channel. In some implementations, creation object tracker 434 can determine when the creation object is in various postures, such as when a user's hand is in a particular gesture, the creation object is being held in a certain way, or a button is being pressed on the creation object. In some implementations, the creation object tracker 434 can identify coordinates for an offset from the creation object. For example, the user can form a pinch gesture and the creation object tracker 434 can define a virtual stylus in the user's hand from a point where the user's thumb meets her palm and extending out to one inch in front of the pinch position. Additional details on tracking a creation object are provided below in relation to blocks 1202, 1204, and 1208 of FIG. 12.

Content generation engine 436 can create parts of a virtual object based on the position determinations from the creation object tracker 434. For example, as coordinates for drawing by one or more users is provided by the creation object tracker 434, these points can be added to form lines of a 3D object. In various implementations, the user can select other creation tools, such as preformed shapes (e.g., cuboid, sphere, pyramid, cone, etc.) which can be manipulated and positioned as part of the 3D object based on the position determinations from the creation object tracker 434. In some implementations, these additions can be made by multiple users, simultaneously or asynchronously, to create a 3D object. In some implementations, creating the 3D object can be performed within a threshold distance of an existing object or by intersecting with such an existing object, and the created 3D object can be made as an annotation to the existing object. Such an annotation can be attached to the existing object as part of that object or as a separate, associated object such that the annotation can be shown or hidden. Additional details on generating content based on creation object positions are provided below in relation to FIGS. 5-7, 12 and 13.

Collapsing engine 438 can generate a 2D image representing a 3D object in the user's field of view. In some implementations, the collapsing engine 438 can collapse a 3D object to a 2D image by determining a plane that is perpendicular to a user's viewing direction and intersects a particular 3D object and modifying the 3D object such that each point is collapsed to that plane. In other implementations, the collapsing engine 438 can collapse a 3D object to a 2D image by placing a virtual camera in the artificial reality environment to match the user's viewing direction and capturing an image of the user's view point for only a particular layer that includes an object being collapsed. The collapsing engine 438 can replace the 3D object with the generated 2D image. Additional details on collapsing a 3D object into a 2D image are provided below in relation to FIGS. 8-11 and 14.

Expansion engine 440 can replace a 2D image representing a 3D object with the corresponding 3D object. Expansion engine 440 can receive a command to expand a 2D image, retrieve the 3D object associated with the 2D image, and render the 3D object into the artificial reality environment while removing the 2D image. Additional details on replacing a 2D image with a corresponding 3D object in an artificial reality environment are provided below in relation to FIG. 15.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
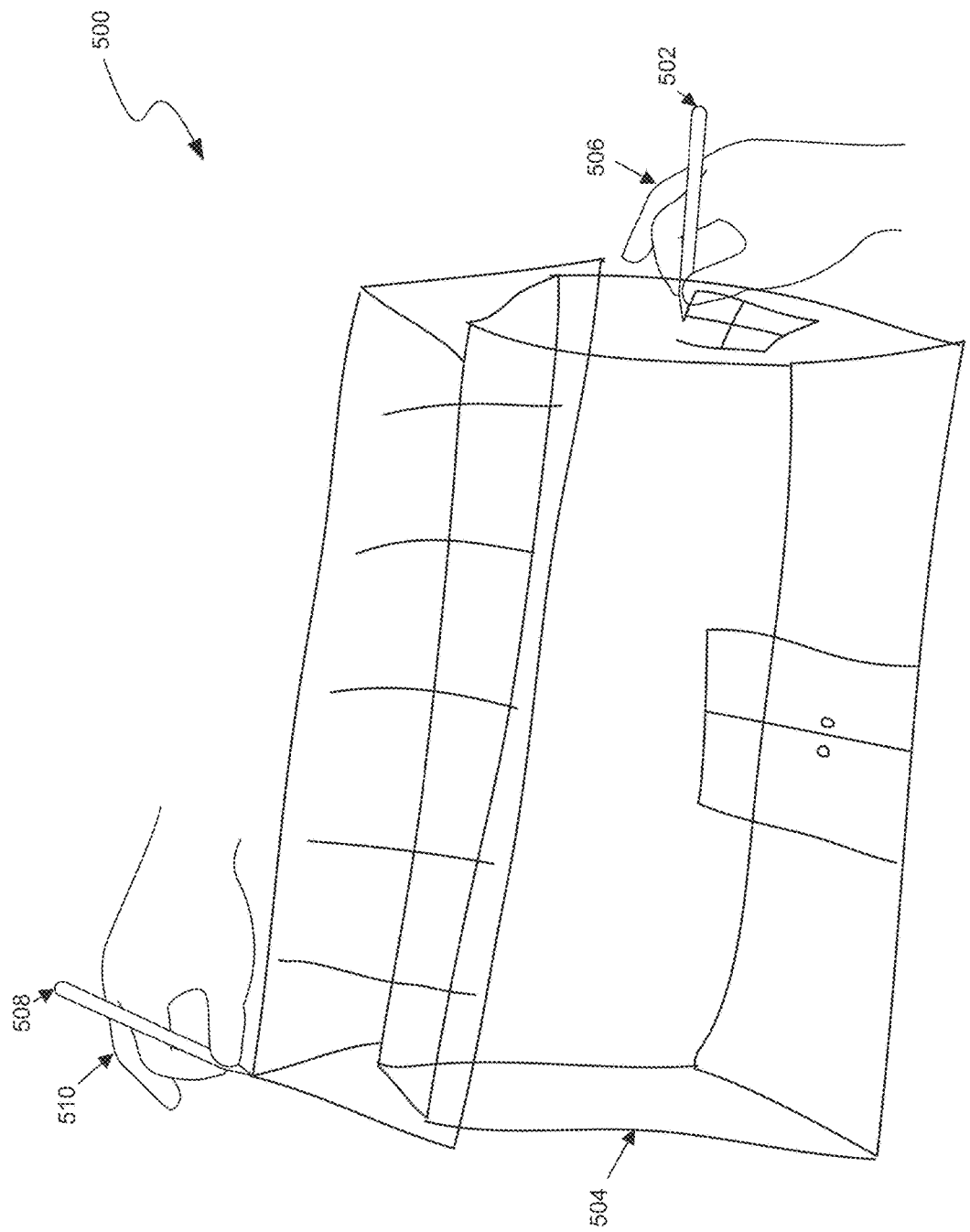
FIG. 5 is an illustration of an example where users are manipulating creation objects to generate a 3D object in an artificial reality environment.

FIG. 5 is an illustration of an example 500 where users 506 and 510 are manipulating creation objects 502 and 508 to generate a 3D object 504 in an artificial reality environment. In example 500, creation object 502 is an ordinary pen a user is manipulating and which an XR device is tracking to determine a tip of the pen. As the pen is manipulated, a line is drawn in the artificial reality environment corresponding to subsequent positions of the pen tip. In example 500, content created by users 506 and 510 include a series of connected coordinate points (e.g., 3D coordinates) in the artificial reality environment. Multiple series of these connected coordinate points are used to construct portions of the 3D object or to annotate an existing object.

In some embodiments, multiple users (e.g., users 506 and 510) can add content to a 3D object via multiple XR devices that communicate with each other to present a shared artificial reality environment. The users can view the 3D object from varying perspectives and provide content from different perspectives. This can allow for collaboration between multiple users in generation of content and/or increased detail in 3D objects.

Figure 6:
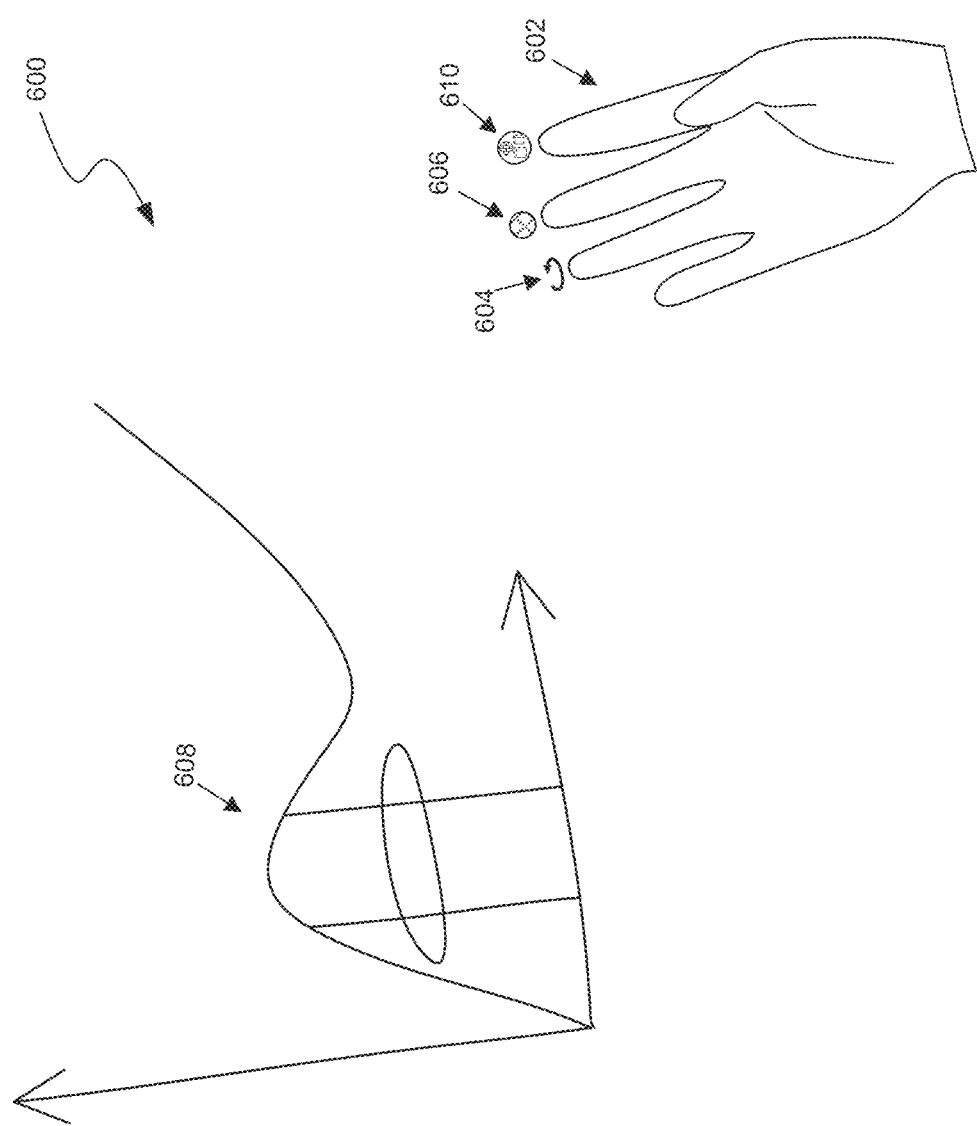
FIG. 6 is an illustration of an example for using finger-tip controls to create and modify a drawing.

FIG. 6 is an illustration of an example 600 for using finger-tip controls to create and modify a drawing. In example 600, a creation object 602 is a hand of a user. When the creation object 602 is in a particular posture, such as directed upward, controls can be displayed relative to the creation object 602. In this example, the controls are finger-tip controls placed at the tip of the user's fingers. These controls present multiple options to modify aspects of the creation object or aspects of the 3D object.

Example aspects of the creation object that can be modified can include a manipulation tool 604 which allows the user to move, resize, or rotate the target object 608; a color selection tool which allows the user to set a color for newly added portions of the target object 608 or to change a color for a selected portion of the target object 608; and a tool selection object 610, which allows a user to select a type of input for new content creation (e.g., as a pen or to select pre-formed shapes). In some implementations, the user can select a finger-tip control by making a selection action, such as by pinching the user's thump to the tip of the finger corresponding to the control.

Figure 7:
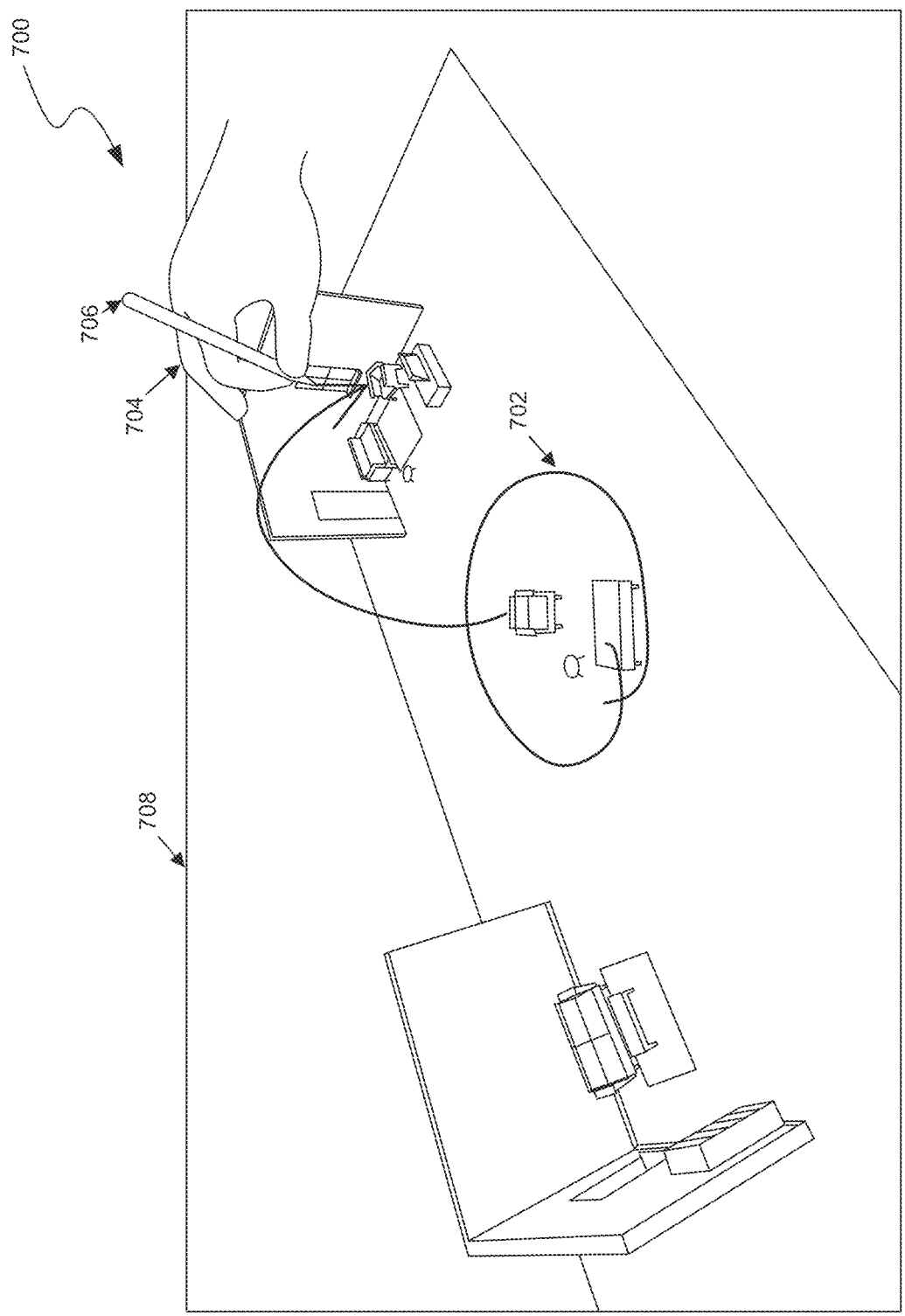
FIG. 7 is an illustration for an example of annotating a 3D object in an artificial reality environment.

FIG. 7 is an illustration for an example 700 of annotating a 3D object in an artificial reality environment. In example 700, the user 704, via a creation object 706, can add annotation content 702 to a 3D object 708. The annotation content can indicate lines, arrows, text, etc., related to an existing or new 3D object. As noted in greater detail below, annotation content can be added in a 2D image generated from a 3D object. In some implementations, a drawing is created as an annotation on an existing object when the drawing intersects with the existing object or comes within a threshold distance of the existing object. In example 700, the annotation 702 intersects with model 708, and is therefore considered an annotation on model 708. The annotation 702 is saved in association with the model 708 as a virtual object appended to the model 708.

Figure 8A:
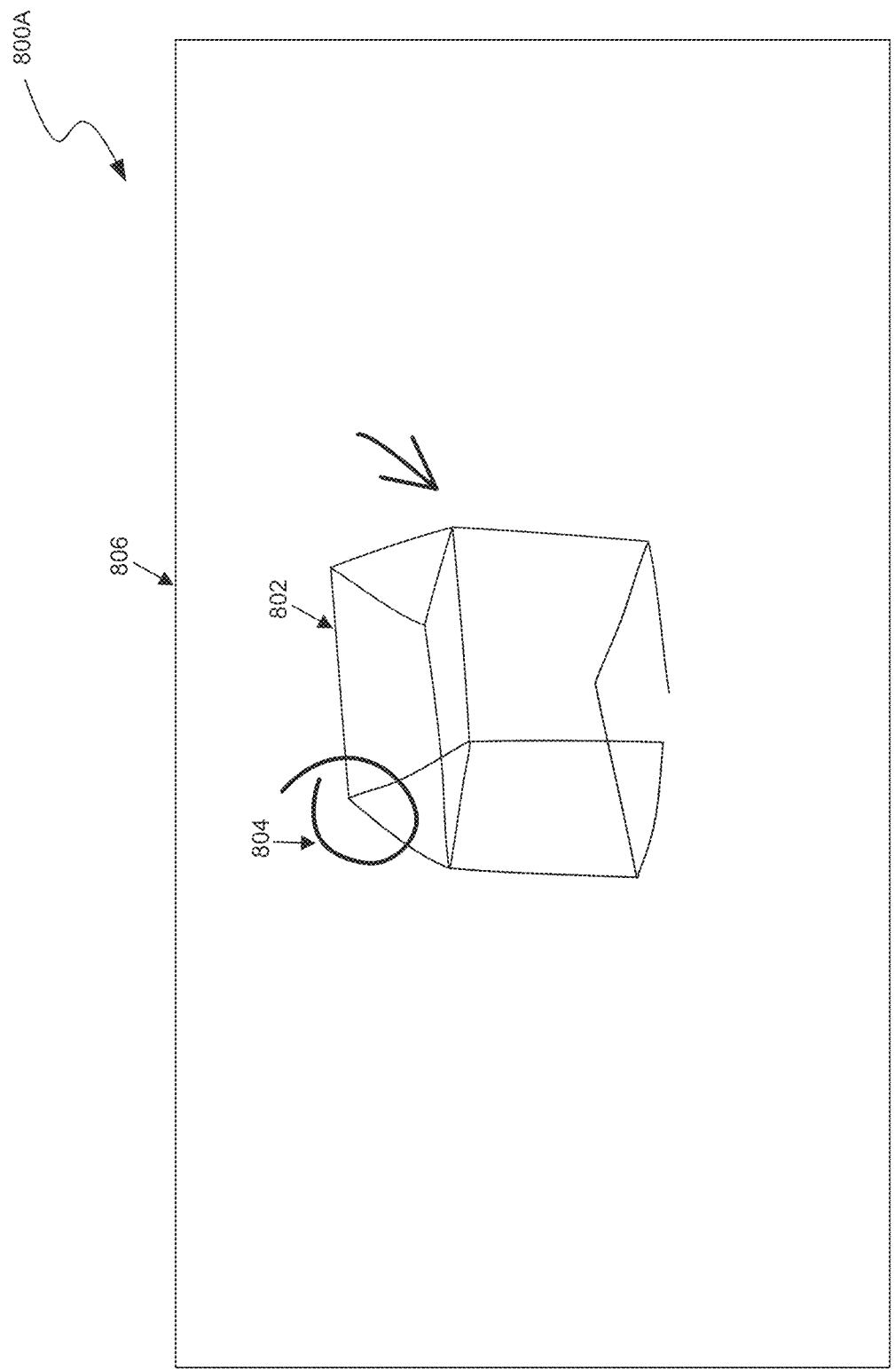
FIGS. 8A and 8B illustrate a sequence where 3D object is collapsed into a 2D image.
Figure 8B:
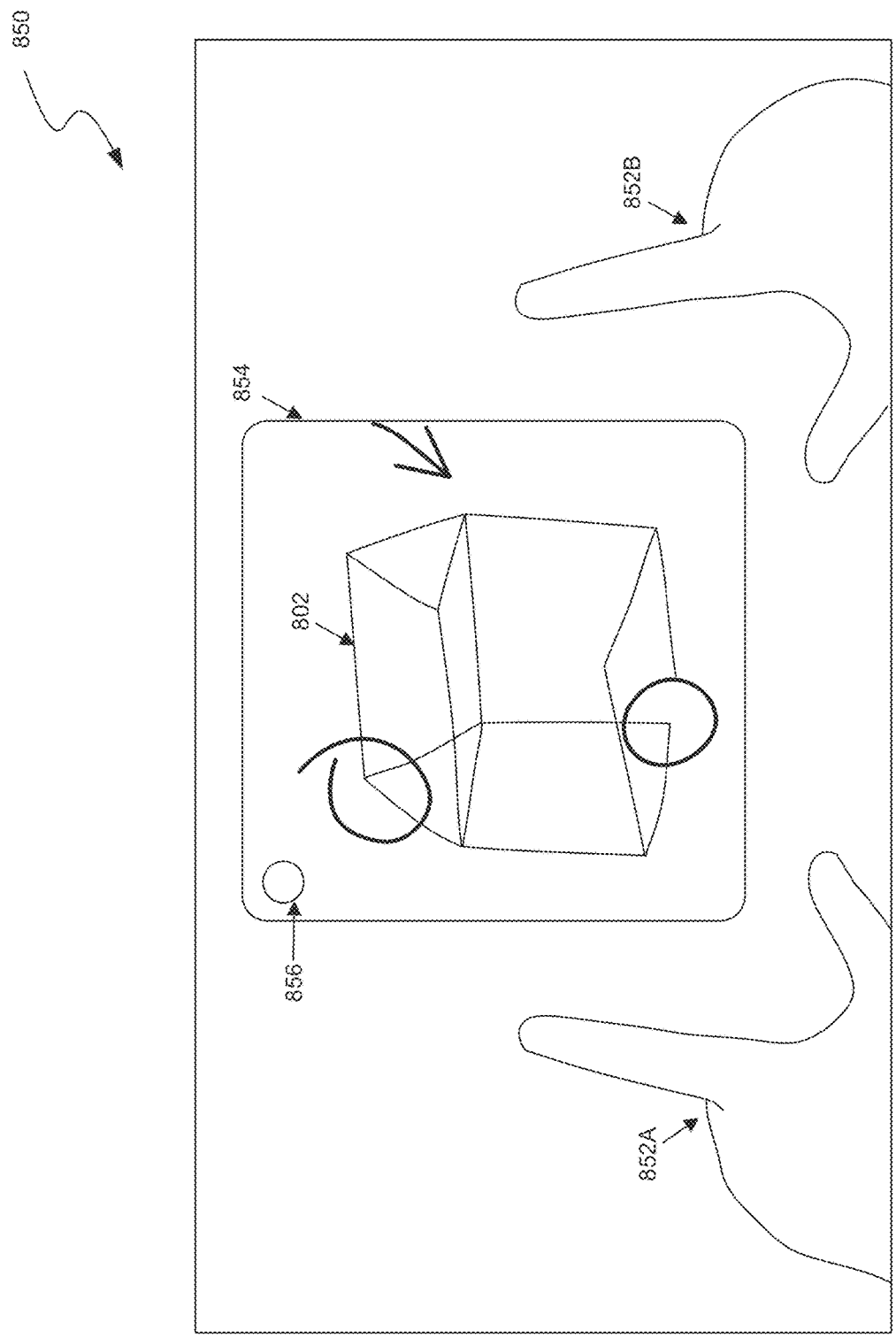

FIGS. 8A and 8B illustrate a sequence where 3D object (with annotations) is collapsed into a 2D image. In FIG. 8A, a 3D object 802 (and associated annotation content 804) is in the user's field of view 806. This object 802 can be identified as the object to be collapsed, upon a user collapse command, by virtue of it being the closest object to the center of the user's field of view. In other implementations, other indicators can cause an object to be the collapsed object, such as the collapse command being activated in relation to the object. For example, a collapse gesture can indicate the object, or the collapse command can originate from a context menu on the object.

In FIG. 8B, a user makes a two-hand capture gesture using hands 852A and 852B to indicate that the object 802 in the center of the user's field of view should be collapsed into a 2D image. In response to recognizing this gesture, the virtual object system can create a 2D image 854 of the object 802 (and annotations 804) and replace the object 802 with the 2D image 854 (as described below in relation to FIGS. 9 and 14). This can reduce the amount of data needed to render the artificial reality environment and the computational resources needed to interact with objects in the artificial reality environment. Further, as discussed below, a user can select the control 856 on the 2D image 854 (e.g., by pinching it) to cause the virtual object system to replace, in the artificial reality environment, the 2D image 854 with the object 802 (with annotations 804).

Figure 9A:
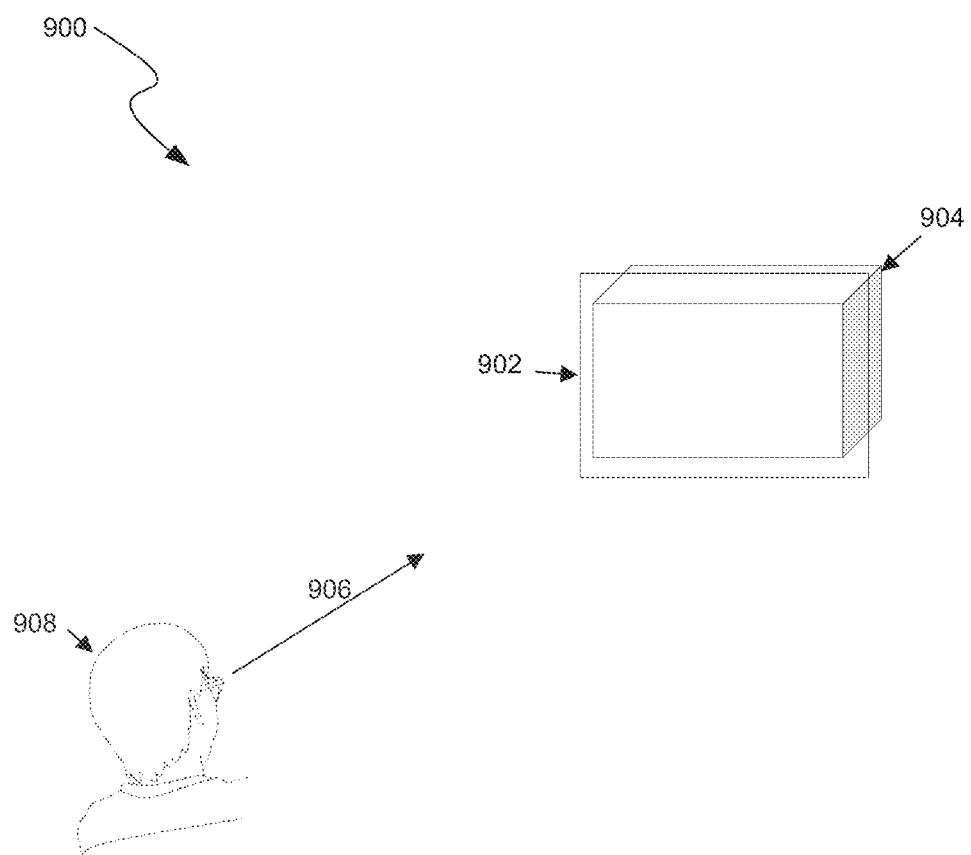
FIGS. 9A and 9B illustrate conceptual diagrams of alternate processes for collapsing a 3D object into a 2D image.
Figure 9B:
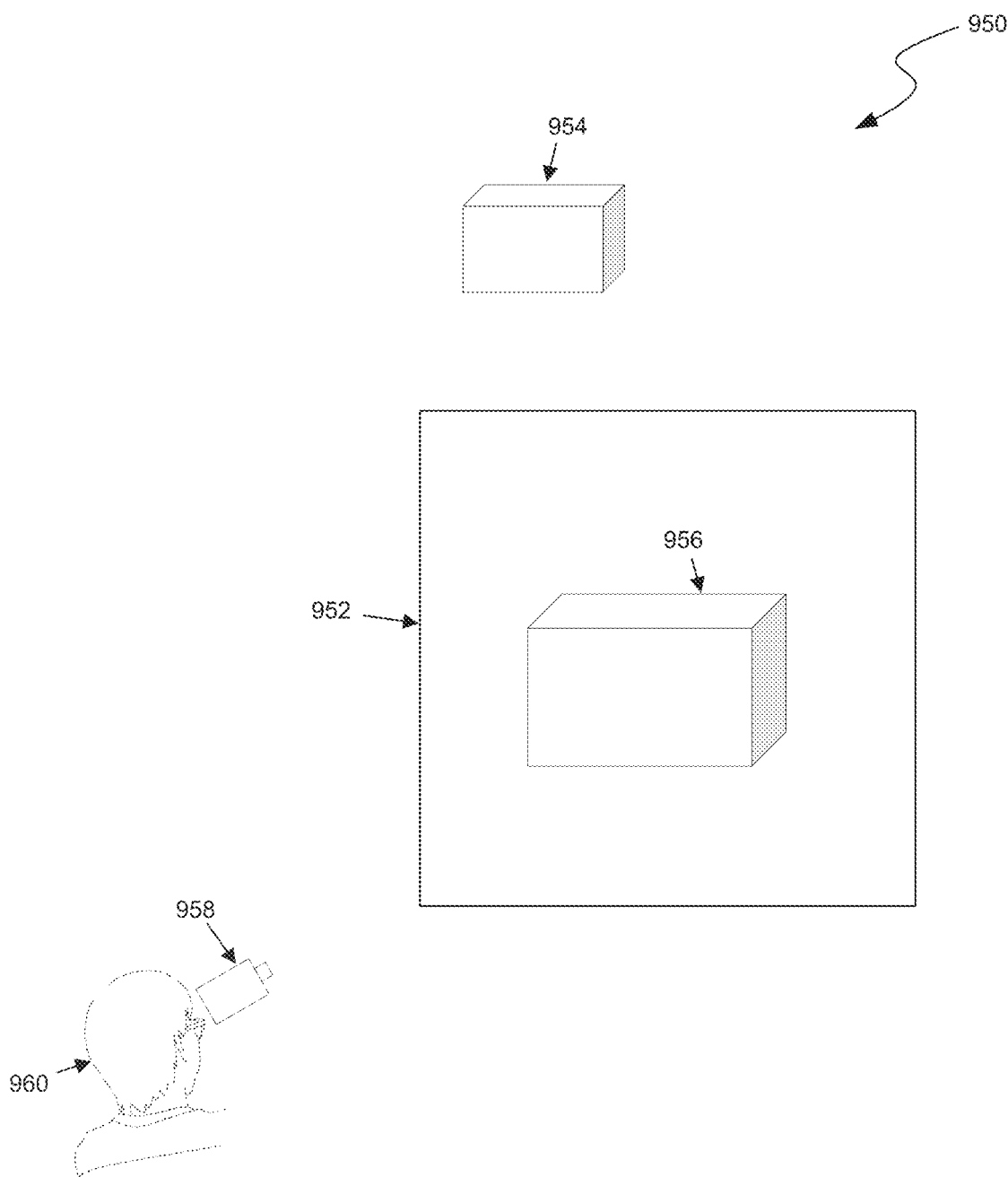

FIGS. 9A and 9B illustrate conceptual diagrams of alternate processes for collapsing a 3D object into a 2D image. In each case, a user command such as the gesture in FIG. 8B (not show in FIGS. 9A and 9B) can be made to signal collapsing of object 904 or 956. Responsive to the command, the system can collapse the 3D object 904 or 956 into a 2D image representing the 3D object.

In a first embodiment, as shown in example 900 of FIG. 9A, the virtual object system can determine a direction of the user's 908 view, as shown by vector 906. The virtual object system can establish a plane 902 that is perpendicular to vector 902. In various implementations, the plane 902 can be established at various points intersecting with the 3D object 904, such as at the point closest to the user 908, 2D image can be generated by modifying 3D coordinates of the 3D object from a perspective of the user viewing the 3D object. This can include deriving a vector 910 of the user 908, furthest from the user 908, or, as shown in example 900, at the midpoint of the 3D object 904. The virtual object system can modify all coordinate points of the 3D object to correspond to the plane—moving them along the direction of the vector 906 until they are on the plane 902, effectively collapsing those points onto the plane. For instance, 3D coordinates (x, y, z) of points of the 3D object 904 can be modified to include 2D coordinates (x, y), with a (z) coordinate that corresponds to the plane 902. In this way, the 2D image comprising 2D coordinates can be from a perspective of the user.

In a second embodiment, as shown in example 950 in FIG. 9B, the virtual object system can generate a 2D image using a virtual camera 958 positioned from the viewpoint of the user 960. The virtual camera 958 can include a virtual imaging system that captures a portion of a rendered scene as a 2D image. The virtual camera can be configured to only capture content that is in certain layers of the rendered scene. In example 950, the virtual camera can be configured to only capture content from the layer 952 that contains the target 3D object 956 (excluding other objects in the scene, such as object 954 which is not in the 952 layer). The virtual object system can then use the virtual camera to capture a 2D image of the 3D object 956 from the perspective of the user 960.

FIG. 10 is an illustration 1000 of multiple 2D images, corresponding to 3D objects, disposed in an artificial reality environment. As shown in FIG. 10, multiple 2D images (e.g., 2D images 1002, 1004, 1006, and image stack 1008) representing 3D objects can be presented in the artificial reality environment. In various implementations, a surface can have an arrangement such as a grid pattern that such 2D images can be snapped to. In some cases, a user can group a set of 2D images, which can be displayed together such as by a representative item in the group or stacked, as shown by image stack 1008. Allowing a user to work with the 2D image representation of 3D objects can declutter the artificial reality environment and make it easier for the user to manage multiple objects.

As noted below, responsive to a selection of a 2D image depicted in the artificial reality environment, the system can retrieve information to render the 3D object and present the 3D object in the artificial reality environment instead of the 2D image. For example, the images can include a control, such as button 1010, which, when pressed, can cause the 2D image to be replaced with the 3D object.

Figure 11:
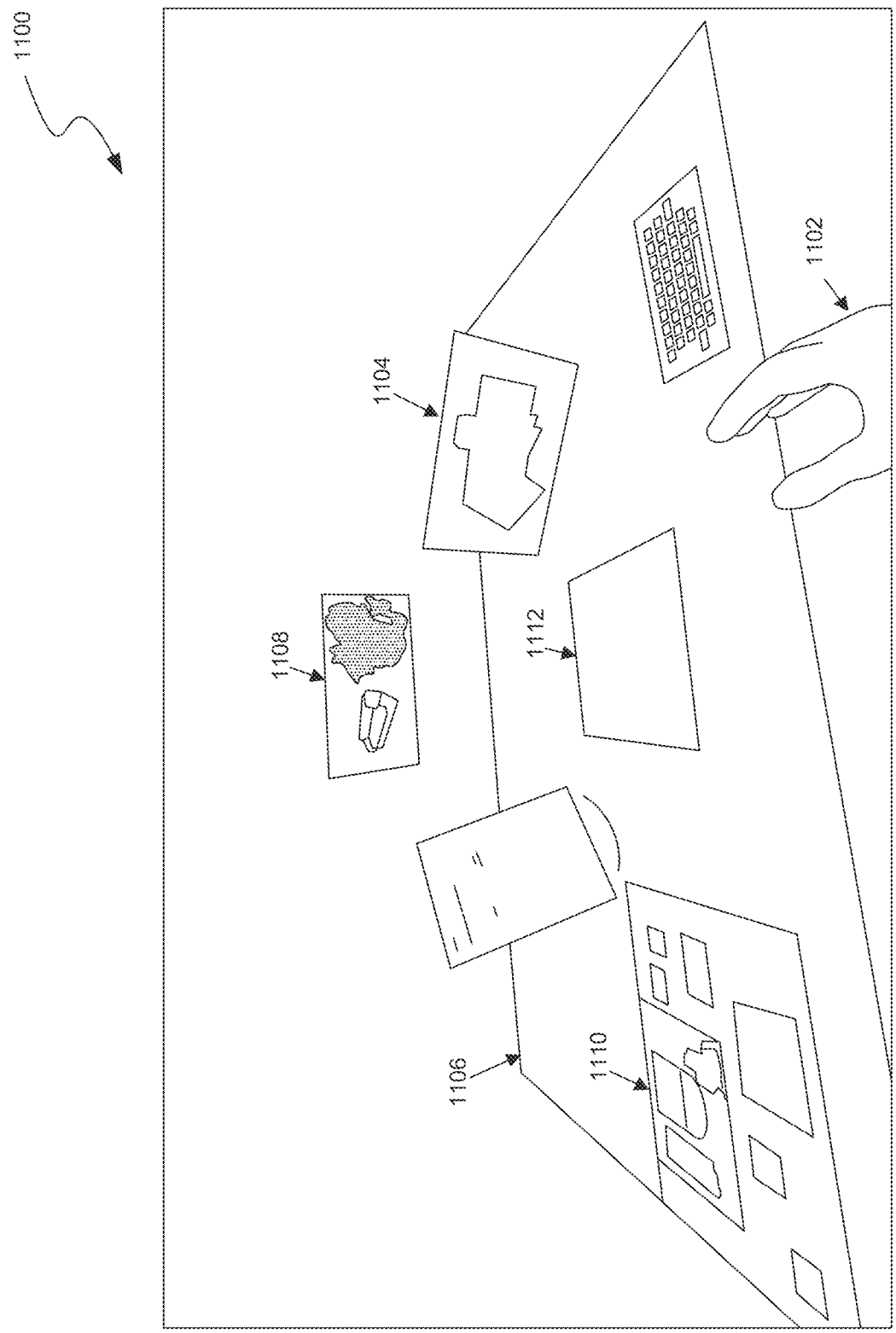
FIG. 11 is an illustration of multiple 2D images, corresponding to 3D objects, arranged on various surfaces in an artificial reality environment.

FIG. 11 is an illustration 1100 of multiple 2D images (1104, 1108, 1112, and a set of images in an area 1110), corresponding to 3D objects, arranged on various surfaces in an artificial reality environment. For example, as shown in FIG. 11, an artificial reality environment can include an identified real-world surface 1106—in this case a desk, which also has a defined area 1110 with a layout that images snap to when placed in the area 1110. A user 1102 can arrange 2D images in the artificial reality environment. For example, the user 1102 has placed image 1104 as a standing image snapped to the surface of desk 1106 and image 1112 as a flat image also snapped to the surface of desk 1106. The user 1102 has further placed image 1108 as a floating image, not snapped to a surface. Finally, the user 1102 has placed a number of images in area 1110, which snap to a layout defined for area 1110.

Figure 12:
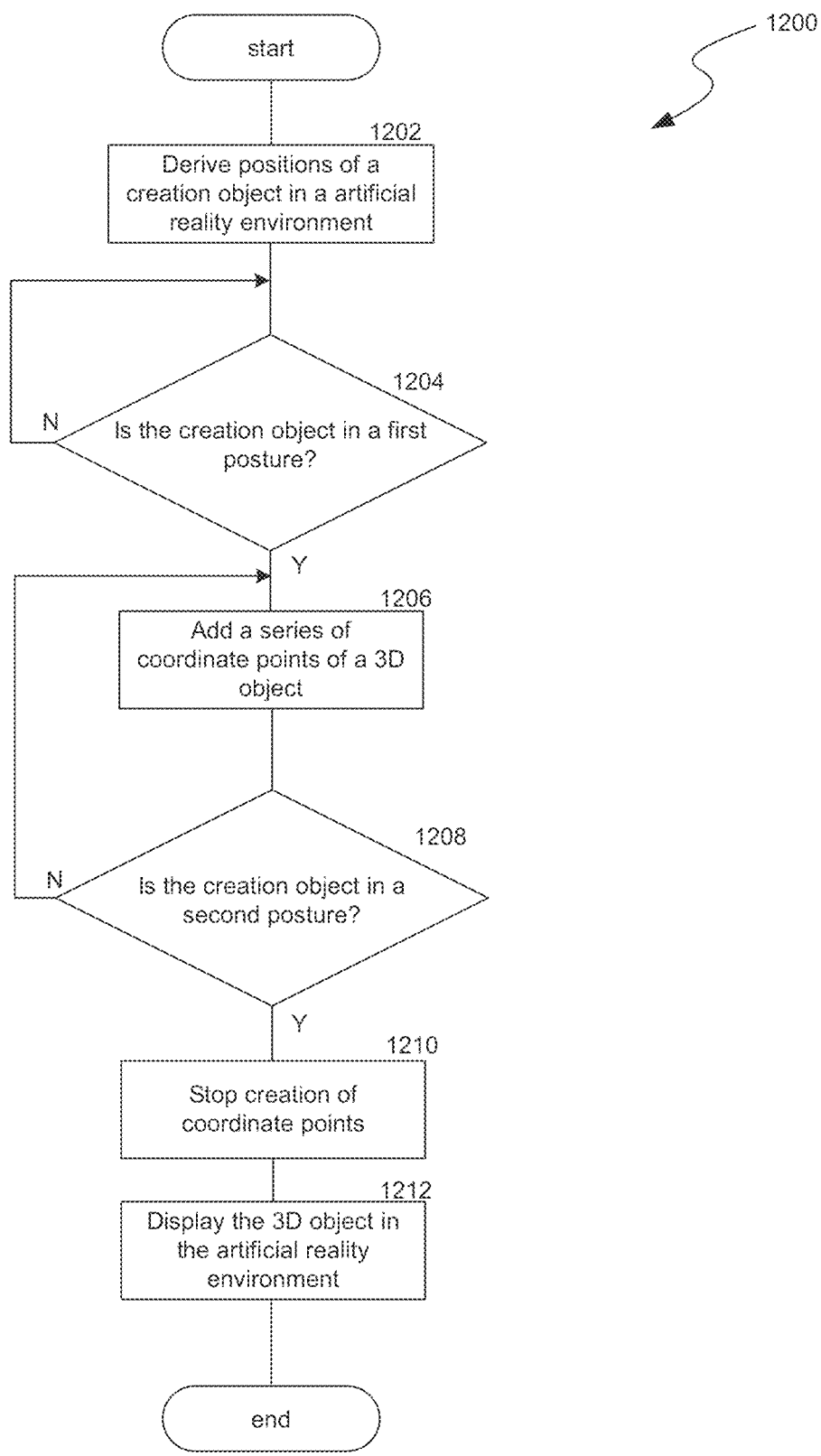
FIG. 12 is a flow diagram of a process for creating content for a 3D object in an artificial reality environment.

FIG. 12 is a flow diagram of a process 1200 for creating content for a 3D object in an artificial reality environment. In some implementations, process 1200 can be performed by an XR device. In some implementations, process 1200 can be performed in response to a user selection of a drawing application on the XR device. In other cases, the drawing application can be automatically activated in certain conditions or when the XR device powers on, and drawing can be enabled in response to a command such as a UI control activation, spoken command, or gesture.

At block 1202, process 1200 can being monitoring positions of a creation object in an artificial reality environment. A creation object can include an object controlled by the user, such as the hands of the user, a controller or stylus, or a non-electronic object such as a pen held by the user. Process 1200 can derive a position of the creation object in the artificial reality environment by identifying 3D coordinates including the creation object. In some implementations, the 3D coordinates can be at an offset from the creation object. For example, a user can make a gesture bringing her thumb-tip to the tips of both her index and middle fingers (e.g., a "pen holding" gesture similar to how a person holds a pen) and process 1200 can determine a line extending from where the user's thumb connects to her hand, passing through the point where the user's thumb and fingers touch, and extending out another set amount (e.g., ¾ of an inch); the end of this line can be the 3D coordinates for the tip of a virtual stylus used for 3D drawing.

At decision block 1204, process 1200 can determine whether the creation object is in a first posture. The first posture can include a hand gesture, pen position, button activation, or other input mapped to signal a start to a drawing. For instance, the first position can include the user making the "pen holding" gesture indicating a desire to draw additional structure to a 3D object or annotate a 3D object. In some implementations, other input can be used, such as a voice control or activating UI elements.

Responsive to determining that the creation object is not in a first posture, process 1200 can remain at block 1204, periodically reviewing the creation object positions to determine whether the creation object is in the first posture. When the creation object is in the first posture, process 1200 can continue to block 1206.

At block 1206, process 1200 can add a series of coordinate points to a 3D object. As process 1200 continues to monitor the position of the creation object, as a user moves the writing tip of the creation object, it forms the series of coordinate points for lines to add to the 3D object. The series of coordinate points can include a set of associated coordinates representing added content to the 3D object or annotation content (as described below). The coordinate points can be defined as the user moves the creation object in three dimensions. In some implementations, the user can select drawing tools other than lines, such as preformed shapes (e.g., 2D shapes such as ovals, triangles, rectangles, etc. or 3D shapes such as cuboids, pyramids, cones, cylinders, etc.) which the user can size and place in the artificial reality environment according to positions of the creation object. Other tools can also be used such as a text tool, color selector, eraser, etc. which can also be controlled using the creation object.

The user can continue to add to or adjust the 3D object until, at decision block 1208, process 1200 determines that the creation object is in a second posture. The second posture can include an input mapped to stopping the drawing, such as pressing or releasing a button, making or releasing a gesture, holing the creation object at particular angles, etc. In some implementations, other input can be used, such as voice commands or activating UI elements.

At block 1210, in response to identifying the second posture, process 1200 can stop creation of coordinate points or other drawing additions to the 3D object. Process 1200 can save any added content to the 3D object and/or associate the content with the user. At block 1212, process 1200 can display the drawn 3D object in the artificial reality environment. The displayed 3D object can include any content added by the user. Process 1200 can then end.

Figure 13:
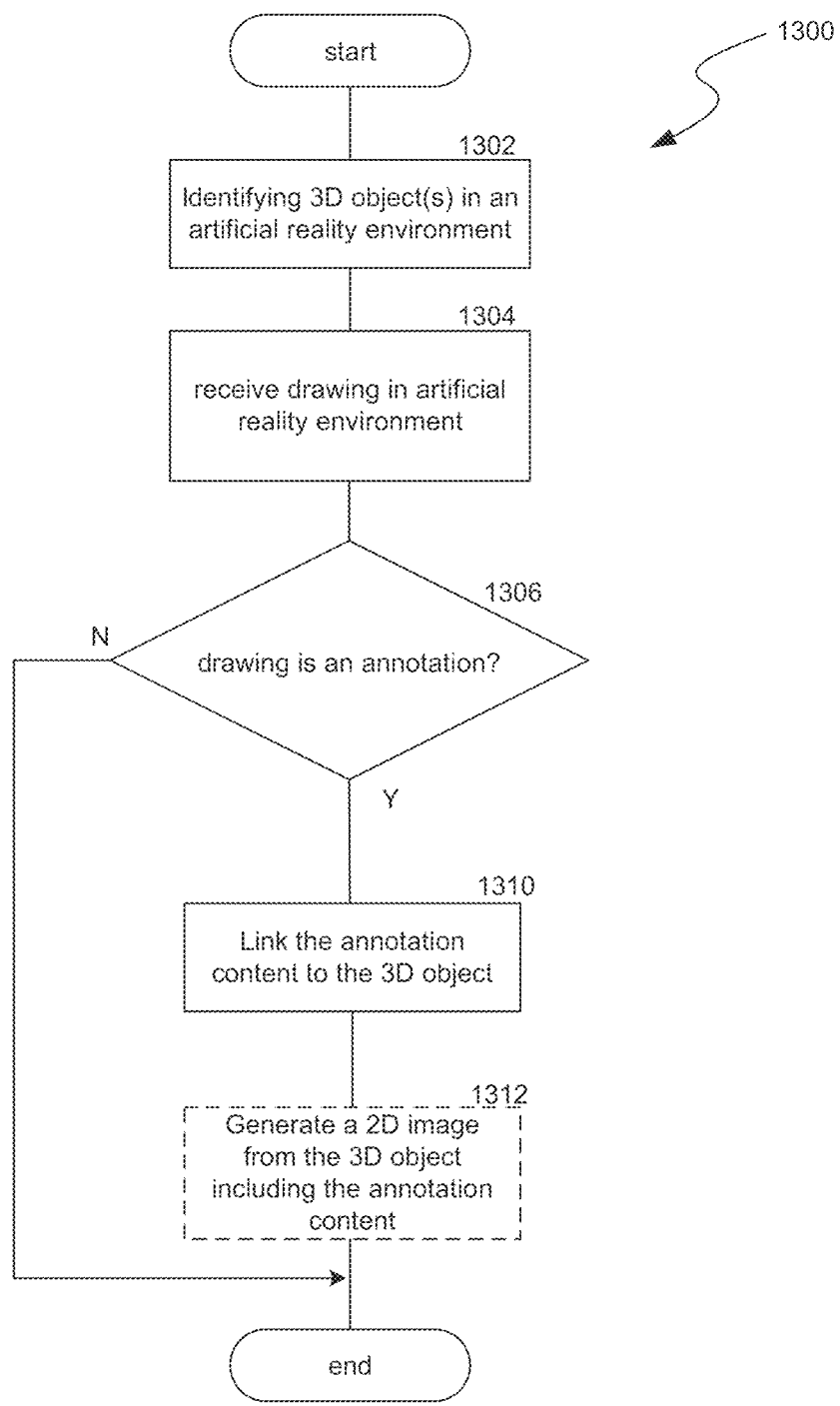
FIG. 13 is a flow diagram of a process for adding annotation content to a 3D object in an artificial reality environment.

FIG. 13 is a flow diagram of a process 1300 for adding annotation content to a 3D object in an artificial reality environment. In some implementations, process 1300 can be performed by an XR device. In some implementations, process 1300 can be performed in response to a user selection of a drawing application on the XR device. In other cases, the drawing application can be automatically activated in certain conditions or when the XR device powers on, and drawing can be enabled in response to a command such as a UI control activation, spoken command, or gesture.

At block 1302, process 1300 can identify one or more objects in an artificial reality environment. In various implementations, these objects can be either or both of real objects or virtual objects. Various of these objects can be related, such as objects for different aspects of a building or multiple features of a design of a vehicle, for example.

At block 1304, process 1300 can receive a drawing in the artificial reality environment. In some implementations, this can be performed using process 1200. At decision block 1306, process 1300 can determine whether the received drawing is an annotation of one of the objects identified at block 1302. For example, a drawing can be identified as an annotation on an object when it intersects with the object, part of the drawing is within a threshold distance of the object, or the drawing was initiated by pressing an annotate control on the object. If the drawing is not an annotation, the drawing is treated normally and process 1300 ends. Otherwise, process 1300 can continue to block 1310.

At block 1310, process 1300 can link the drawing, as annotation content, to the 3D object. Linking the annotation content can include creating an association in a database of objects, adding an annotation parameter to the 3D object specifying an ID of the annotation object, adding an annotation parameter to the annotation specifying an ID of the object 3D object, etc. In some implementations, the annotation content can be added as part of the 3D object, merging the two. In other implementations, the 3D object and the annotation content can be as kept separate, attached items (allowing annotation content to be individually shown or hidden).

At block 1312, process 1300 can generate a 2D image from the 3D object including the annotation content. In various implementations, generating the 2D image can be performed using process 1400 or 1450 described below. While as noted above any block can be excluded in certain implementations, block 1312 is shown in dashed lines to call out a particular embodiment where the 3D object is not converted to a 2D image.

Figure 14A:
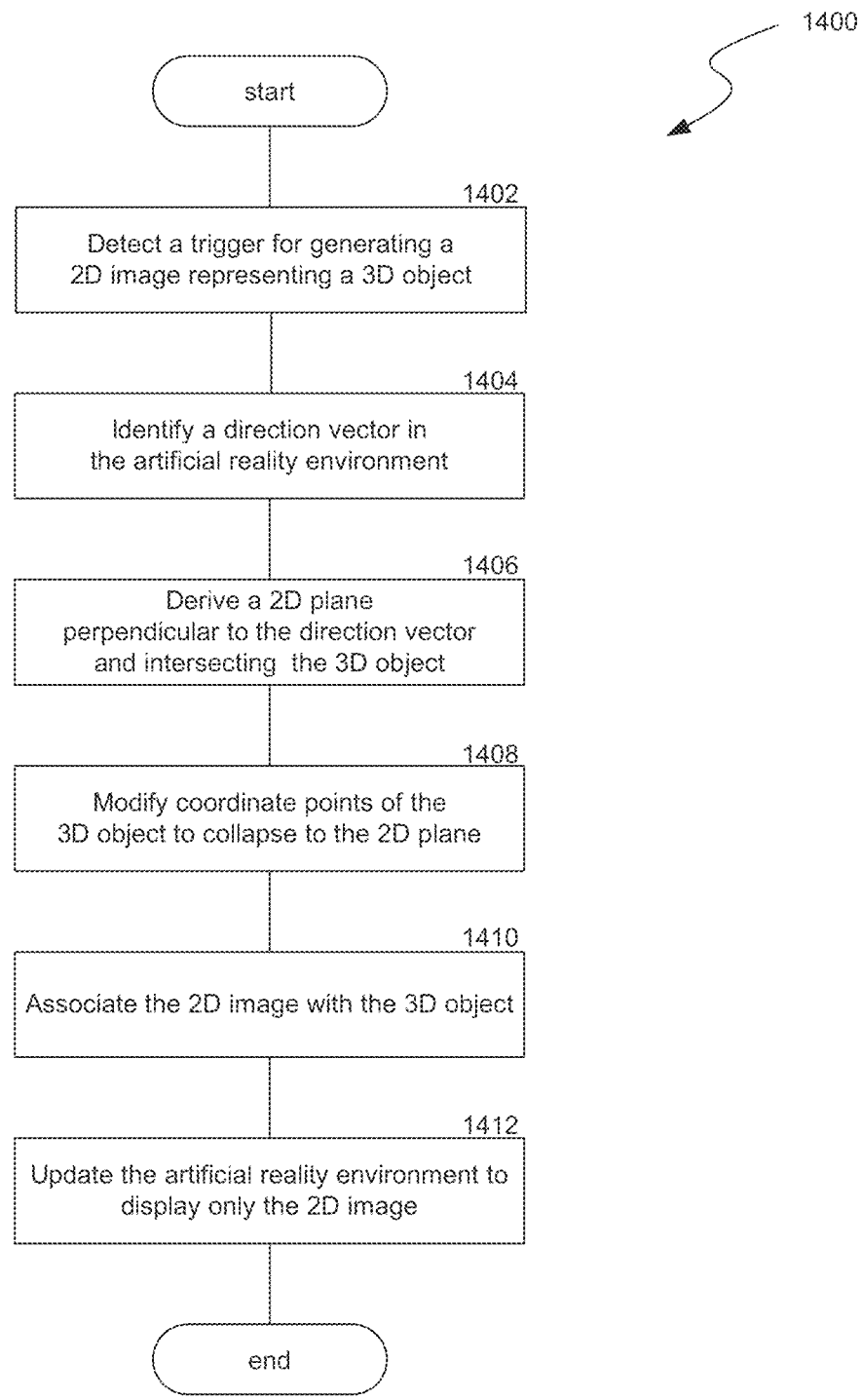
FIG. 14A is a flow diagram of a process for collapsing a 3D object to a 2D image according to a first embodiment.

FIG. 14A is a flow diagram of a process 1400 for collapsing a 3D object to a 2D image according to a first embodiment. In some implementations, process 1400 can be performed by an XR device. In various implementations, process 1400 can be a process executed as part of a drawing application or other application a user executes or a process performed as part of an operating system or other environment-controlling "shell" system (e.g., executed when the XR device starts up or initiates certain environments).

At block 1402, process 1400 can detect a trigger for generating a 2D image representing a 3D object. Examples of a trigger include detecting a specific posture of one or both hands of the user ("gestures"), a voice command, activating a UI control (e.g., a collapse control attached to the 3D object or included in another part of the UI), etc. Process 1400 can determine the 3D object to collapse based on it being associated with the trigger, e.g., where the trigger was initiated upon the 3D object or was focused at it. For example, a user gesture can include a direction component and process 1400 can determine a closest object the direction component intersects. As a more specific example, the user can make a gesture framing an object with her fingers, and the object determined to be in the center of that frame, from the user's point of view, can be the selected 3D object. As an alternative example, a "collapse" UI element can be attached to certain 3D objects, and that object can be selected when its control is actuated. As yet another example, a user can perform a voice command (e.g., speaking "collapse") and the selected 3D object can be the one the user's gaze was directed to when the command was spoken.

At block 1404, process 1400 can identify a direction vector in the artificial reality environment. The direction vector can include a vector identifying a perspective of the XR device user, directed at the 3D object. For instance, the vector can include 3D coordinates originating from the XR device and directed at the 3D object. In some implementations, the vector can be based on head tracking (e.g., using XR device positioning sensors, IMU data, etc.) and/or eye gaze tracking (e.g., using cameras tracking the position of a user's eyes).

At block 1406, process 1400 can derive a 2D plane that is perpendicular to the direction vector and that intersects the selected 3D object. In various implementations, the plane can be the perpendicular plane that is closest to the user while intersecting the 3D object, farthest from the user while intersecting the 3D object, that bisects the 3D object, or some other point on the 3D object.

At block 1408, process 1400 can modify coordinate data of each coordinate point of the 3D object to collapse to the 2D plane derived at block 1406. This can include modifying 3D coordinates of the 3D object into 2D coordinates that correspond to the plane. For example, process 1400 can modify each coordinate point to move along a path parallel to the direction vector identified at block 1404 to intersect with the 2D plane (i.e., "collapsing" them). Where coordinate points overlap when collapsed to the 2D plane, only the coordinate point closest to the XR device is included in the 2D image. The result of this collapsing is a 2D image, from the user's point of view, of the 3D object.

At block 1410, process 1400 can associate the 2D image with the 3D object. The 2D image can be linked to the 3D object that can allow for retrieval of 3D object data responsive to a selection of the 2D image. As examples, a table can be defined associating 2D images and 3D objects, or a parameter in the 3D object can specify an ID of the corresponding 2D image and a parameter in the 2D image can specify an ID of the corresponding 3D object.

At block 412, process 1400 can update the artificial reality environment to display only the 2D image. The 3D object can be removed and replaced with the 2D image. This can allow for lower data, processing, and power required to render the artificial reality environment and greater ease in organizing objects. As noted below in relation to process 1500, the user can later cause the 3D object to replace the corresponding 2D image.

Figure 14B:
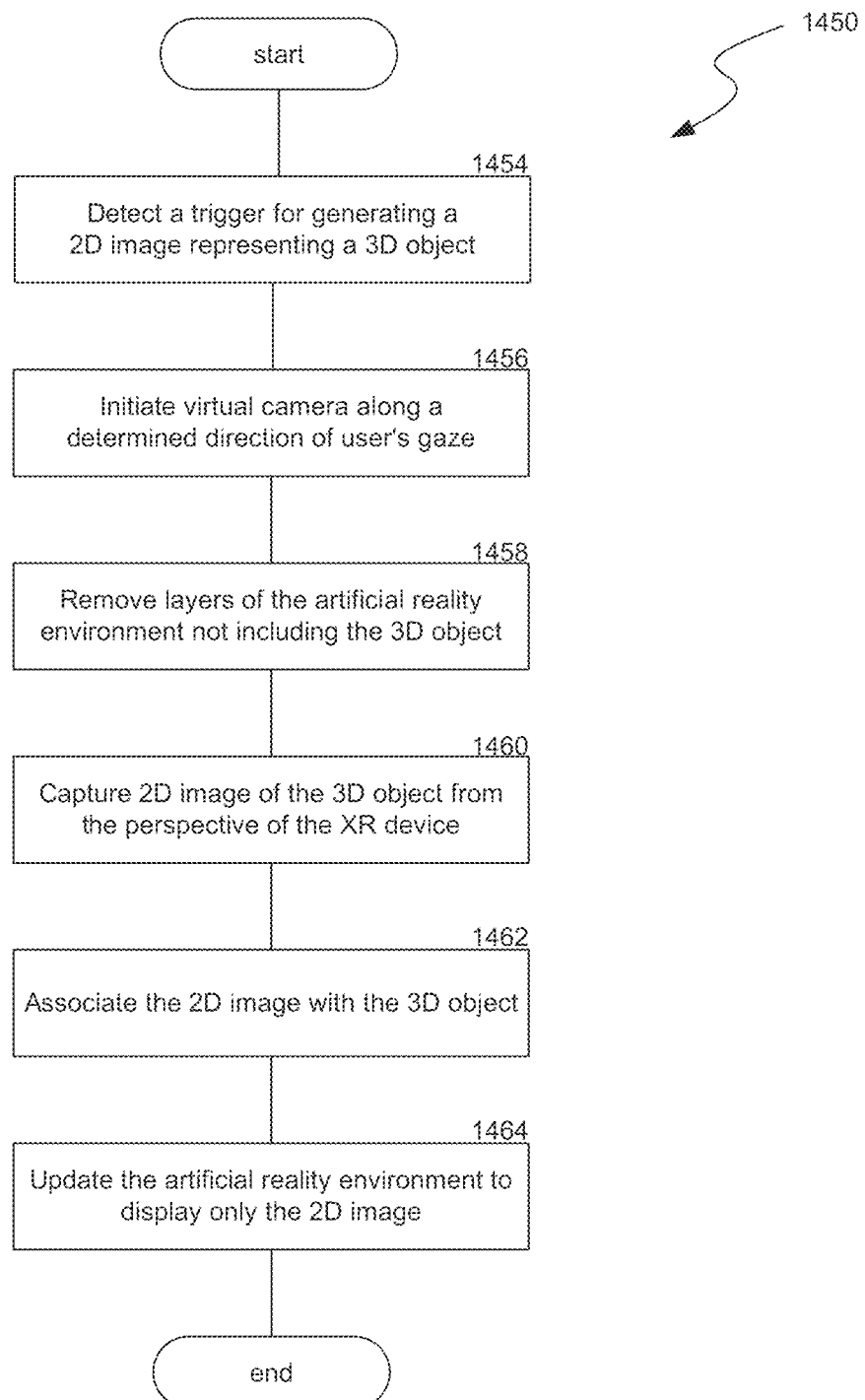
FIG. 14B is a flow diagram of a process for collapsing a 3D object to a 2D image according to a second embodiment.

FIG. 14B is a flow diagram of a process 1450 for collapsing a 3D object to a 2D image according to a second embodiment. In some implementations, process 1450 can be performed by an XR device. In various implementations, process 1450 can be a process executed as part of a drawing application or other application a user executes or a process performed as part of an operating system or other environment-controlling "shell" system (e.g., executed when the XR device starts up or initiates certain environments).

At block 1454, process 1450 can detect a trigger for generating a 2D image representing a selected 3D object. Examples of a trigger include detecting a specific posture of one or both hands of the user ("gestures"), a voice command, activating a UI control (e.g., a collapse control attached to the 3D object or included in another part of the UI), etc. Process 1400 can determine the 3D object to collapse based on it being associated with the trigger, e.g., where the trigger was initiated upon the 3D object or was focused at it. For example, a user gesture can include a direction component and process 1400 can determine a closest object the direction component intersects. As a more specific example, the user can make a gesture framing an object with her fingers, and the object determined to be in the center of that frame, from the user's point of view, can be the selected 3D object. As an alternative example, a "collapse" UI element can be attached to certain 3D objects, and that object can be selected when its control is actuated. As yet another example, a user can perform a voice command (e.g., speaking "collapse") and the selected 3D object can be one the user's gaze was directed to when the command was spoken.

At block 1456, process 1450 can initiate a virtual camera in the artificial reality environment directed along a determined direction of the user's gaze. The user's gaze can be determined based on head tracking (e.g., using XR device positioning sensors, IMU data, etc.) and/or eye gaze tracking (e.g., using cameras tracking the position of a user's eyes).

At block 1458, process 1450 can remove, from data captured by the virtual camera, layers of the artificial reality environment that do not include the 3D object. This can include removing other 3D objects/2D images in the environment.

At block 1460, process 1450 can capture a 2D image of the layer including the 3D object from the perspective of the user. The result of this capturing is a 2D image, from the user's point of view, of the 3D object.

At block 1462, process 1450 can associate the 2D image with the 3D object in a manner as described with respect to block 1410. At block 1464, process 1450 can update the artificial reality environment to display only the 2D image as described with respect to block 1412.

Figure 15:
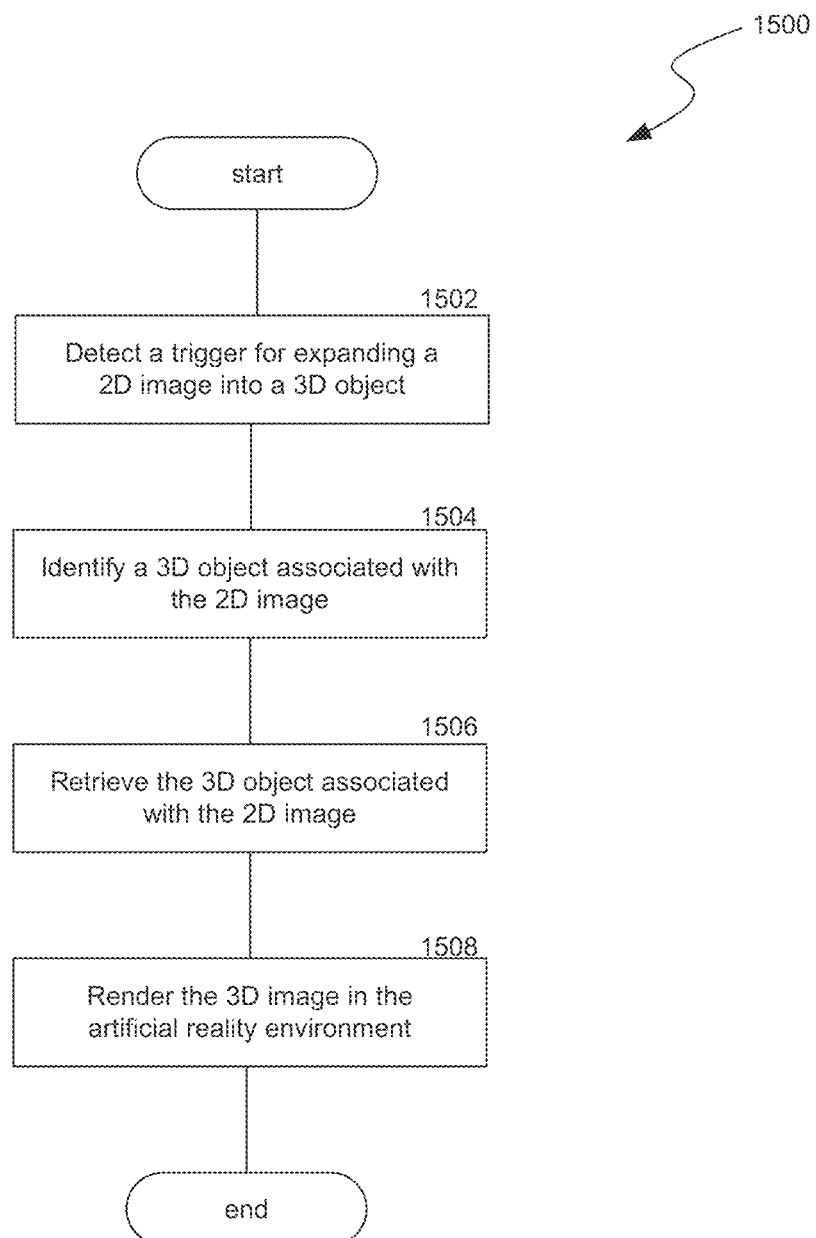
FIG. 15 is a flow diagram of a process for rendering a 3D object responsive to selection of a 2D image.

FIG. 15 is a flow diagram of a process 1500 for rendering a 3D object responsive to selection of a 2D image. In some implementations, process 1500 can be performed by an XR device. In various implementations, process 1500 can be a process executed as part of a drawing application or other application a user executes or a process performed as part of an operating system or other environment-controlling "shell" system (e.g., executed when the XR device starts up or initiates certain environments).

At block 1502, process 1500 can detect a trigger for expanding a 2D image into a 3D object. Examples of a trigger include detecting a specific posture of one or both hands of the user ("gestures"), a voice command, activating a UI control (e.g., an expand control attached to the 2D image or included in another part of the UI), etc. Process 1500 can determine the 2D image to expand based on it being associated with the trigger, e.g., where the trigger was initiated upon the 2D image or was focused at it. For example, a user gesture can include a direction component and process 1500 can determine a closest 2D image the direction component intersects. As another example, a user can perform a voice command (e.g., speaking "expand") and the selected 2D image can be the one the user's gaze was directed to when the command was spoken.

At block 1504, process 1500 can identify a 3D object associated with the selected 2D image. For example, this can include looking up an ID of the 2D image in a relational table mapping it to a corresponding 3D object or retrieving an identification of an associated 3D object from parameters of the 2D image.

At block 1506, process 1500 can retrieve the 3D object identified at block 1504. This can include retrieving the 3D object from memory of the XR device or from an external computing node (e.g., a remote XR device, server, cloud-based server system). For example, the 2D image may have been shared from an external source with a link specifying an internet-based source to from which to retrieve the corresponding 3D object if an expansion command is provided.

At block 1508, process 1500 can render the 3D image in the artificial reality environment. This can include replacing the 2D image with the 3D object in the artificial reality environment.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a three-dimensional (3D) object in an artificial reality environment and replacing the three-dimensional (3D) object with a two-dimensional (2D) image, representing the three-dimensional (3D) object, the method comprising:

detecting a position of a creation object, controlled by a user, in the artificial reality environment;

responsive to identifying that the creation object is in a first posture, adding a series of coordinate points corresponding with the creation object in the artificial reality environment;

generating the 3D object, in the artificial reality environment, based on the series of coordinate points;

detecting a trigger, from a user, for generating the 2D image representing the 3D object;

in response to detecting the trigger, generating the 2D image, comprising a 2D representation of the 3D object, by:

identifying a vector for a determined perspective of the user;

generating a plane that is both perpendicular to the vector and intersects the 3D object;

collapsing 3D coordinates of the 3D object to 2D coordinates in the plane; and generating the 2D image based on the 2D coordinates;

associating the 2D image with the 3D object; and
updating the artificial reality environment to remove the 3D object and present the 2D image in the artificial reality environment.

2. The method of claim 1, wherein the 3D object includes multiple series of coordinate points, each series provided by a different one of multiple users via multiple XR devices.

3. The method of claim 1, further comprising:
identifying that the creation object is in a second posture indicating that the series of coordinate points is complete; and
responsive to identifying that the creation object is in the second posture, stopping any addition of coordinate points to the series of connected coordinate points in the artificial reality environment.

4. The method of claim 1, further comprising:
identifying that the real-world creation object is in a second posture;
responsive to identifying that the creation object is in the second posture, presenting tools to modify features of the series of coordinate points;
wherein the tools include at least a manipulation tool which allows a user to move, resize, or rotate the 3D object and a color selection tool which allows the user to set a color for at least a part of the 3D object.

5. The method of claim 1,
wherein the series of coordinate points are an annotation to an existing 3D object; and
wherein the 2D image comprises a representation both the annotation and the existing 3D object.

6. The method of claim 1 further comprising:
detecting an expansion trigger for the 2D image;
in response to the expansion trigger, retrieving the 3D object based on the association between the 2D image and the 3D object; and
updating the artificial reality environment to render the 3D object and remove the 2D image.

7. The method of claim 6, wherein the 3D object is retrieved from a computing system external to an XR device performing the method.

8. A computing system comprising:
one or more processors; and
one or more memories storing instructions that, when executed by the one or more processors, cause the computing system to perform a process comprising:
detecting, by an extra reality (XR) device, a trigger to collapse a selected 3D object depicted in an artificial reality environment;
identifying a vector for a determined perspective of a user of the XR device;
generating a plane that is both perpendicular to the vector and intersects the 3D object;
collapsing coordinates of the 3D object to the plane;
generating a 2D image based on the collapsed coordinates;
associating the 2D image with the 3D object; and
updating the artificial reality environment to remove the 3D object and present the 2D image in the artificial reality environment.

9. The computing system of claim 8, wherein collapsing the coordinates of the 3D object to the plane comprises moving the coordinates of the 3D object to the plane along paths that are parallel to the vector.

10. The computing system of claim 8, wherein at least some of the coordinates of the 3D object overlap after being collapsed to the plane and wherein generating the 2D image based on the collapsed coordinates comprises keeping, for overlapping coordinates, only the coordinate closest to the XR device.

11. The computing system of claim 8, wherein the process further comprises:
detecting an expansion trigger for the 2D image;
in response to the expansion trigger, retrieving the 3D object based on the association between the 2D image and the 3D object; and
updating the artificial reality environment to render the 3D object and remove the 2D image.

12. The computing system of claim 11, wherein the 3D object is retrieved from a computing system external to the XR device.

13. The computing system of claim 8, wherein the process further comprises:
detecting a position of a creation object;
adding a series of coordinate points for the 3D object based on the position of the creation object; and
generating the 3D object, in the artificial reality environment, based on the series of coordinate points.

14. A computer-readable storage medium storing instructions that, when executed by a computing system, cause the computing system to perform a process comprising:
detecting, by an extra reality (XR) device, a trigger to collapse a selected 3D object depicted in an artificial reality environment;
detecting a direction of a user's gaze;
initiating a virtual camera directed along the direction of the user's gaze;
determining a layer, in the artificial reality environment, that contains the selected 3D object;
capturing a 2D image with the virtual camera, wherein the captured 2D image excludes content that is outside the determined layer containing the selected 3D object; and
associating the 2D image with the selected 3D object; and
updating the artificial reality environment to remove the selected 3D object and present the 2D image in the artificial reality environment.

15. The non-transitory machine-readable medium of claim 14, wherein the 2D image is a first 2D image of multiple 2D images presented in the artificial reality environment, each representing a corresponding 3D object.

16. The non-transitory machine-readable medium of claim 14, wherein the process further comprises:
detecting a position of a creation object, controlled by a user;
generating a series of coordinate points for the 3D object based on the position of the creation object; and
generating the 3D object, in the artificial reality environment, based on the series of coordinate points.

17. The non-transitory machine-readable medium of claim 14, wherein the process further comprises:
detecting an expansion trigger for the 2D image;
in response to the expansion trigger, retrieving the 3D object based on the association between the 2D image and the 3D object; and
updating the artificial reality environment to render the 3D object and remove the 2D image.

18. The non-transitory machine-readable medium of claim 16, wherein the process further comprises sharing the 2D image with an external computing system, wherein the shared version of the 2D image includes a link that provides access to the associated 3D object.

* * * * *